(12) United States Patent
Takagi et al.

(10) Patent No.: US 8,041,718 B2
(45) Date of Patent: Oct. 18, 2011

(54) PROCESSING APPARATUS AND ASSOCIATED METHODOLOGY FOR KEYWORD EXTRACTION AND MATCHING

(75) Inventors: Tsuyoshi Takagi, Kanagawa (JP);
Motoki Tsunokawa, Kanagawa (JP);
Akihiro Watanabe, Kanagawa (JP);
Toshiharu Yabe, Tokyo (JP)

(73) Assignee: Sony Corporation, Tokyo (JP)

( * ) Notice: Subject to any disclaimer, the term of this patent is extended or adjusted under 35 U.S.C. 154(b) by 822 days.

(21) Appl. No.: 11/673,252

(22) Filed: Feb. 9, 2007

(65) Prior Publication Data

US 2007/0192310 A1    Aug. 16, 2007

(30) Foreign Application Priority Data

Feb. 13, 2006 (JP) ................. 2006-035312

(51) Int. Cl.
*G06F 7/00* (2006.01)
*G06F 17/30* (2006.01)
(52) U.S. Cl. ...................... 707/736; 707/748
(58) Field of Classification Search .................. 707/5, 6, 707/4, 736, 748, 749
See application file for complete search history.

(56) References Cited

U.S. PATENT DOCUMENTS

| | | | | |
|---|---|---|---|---|
| 4,849,898 A | * | 7/1989 | Adi | 707/5 |
| 5,291,592 A | * | 3/1994 | Kita | 382/306 |
| 5,943,669 A | * | 8/1999 | Numata | 707/99.003 |
| 6,038,561 A | * | 3/2000 | Snyder et al. | 707/6 |
| 6,167,397 A | * | 12/2000 | Jacobson et al. | 1/1 |
| 6,167,398 A | * | 12/2000 | Wyard et al. | 707/5 |
| 6,189,002 B1 | * | 2/2001 | Roitblat | 1/1 |
| 6,263,121 B1 | * | 7/2001 | Melen et al. | 382/305 |
| 6,602,300 B2 | * | 8/2003 | Ushioda et al. | 715/264 |
| 6,618,727 B1 | * | 9/2003 | Wheeler et al. | 707/748 |
| 6,691,108 B2 | * | 2/2004 | Li | 707/710 |
| 7,028,024 B1 | * | 4/2006 | Kommers et al. | 707/718 |
| 7,113,943 B2 | * | 9/2006 | Bradford et al. | 707/4 |
| 2002/0016787 A1 | * | 2/2002 | Kanno | 707/5 |
| 2003/0065658 A1 | * | 4/2003 | Matsubayashi et al. | 707/4 |
| 2003/0101177 A1 | * | 5/2003 | Matsubayashi et al. | 707/6 |

FOREIGN PATENT DOCUMENTS

| | | |
|---|---|---|
| AO | 2005-115790 | 4/2005 |
| JP | 6-350546 | 12/1994 |
| JP | 2002-269106 | 9/2002 |
| JP | 2003-203088 | 7/2003 |
| JP | 2003-208442 | 7/2003 |
| JP | 2004-23345 | 1/2004 |

* cited by examiner

*Primary Examiner* — Yicun Wu
*Assistant Examiner* — Pavan Mamillapalli
(74) *Attorney, Agent, or Firm* — Oblon, Spivak, McClelland, Maier & Neustadt, L.L.P.

(57) ABSTRACT

An information processing apparatus includes an acquisition unit acquiring keywords extracted from text data representing a first content to be a base of a search and scores of the respective keywords, and keywords extracted from text data representing a second content for calculating a degree of matching with the first content, and scores of the respective keywords, a matching-degree calculation unit calculating the degree of matching between the first content and the second content based on scores of keywords commonly included in the acquired keywords relating to the first content and the acquired keywords relating to the second content, and an output unit outputting, as a search result, information on a predetermined number of the second content which has a high degree of matching with the first content based on a result of calculation performed by the matching-degree calculation unit.

11 Claims, 18 Drawing Sheets

FIG. 15

BASE CONTENT

FEATURING LEE BYUNG HAN × TOKO HASEGAWA. /BEAUTIFUL FISHING (RSS)

LEE BYUNG HAN AND TOKO HASEGAWA WENT TO KOREA, HONG KONG AND JAPAN. WITH SUPERB FISHING TALENT, THEY DID NOT GET CABRILLA.

SEARCH RELATED EVENT

SEARCH RESULT

MR. BYUNG'S NEW MOVIE "HARD FISHING" (RSS)   MATCHING DEGREE: 14.83
KOREAN STAR LEE BYUNG HAN CURRENTLY SPOTLIGHTED TURNED UP IN PREVIEW OF THE LATEST MOVIE "HARD FISHING" WITH MISS KIM. ONLY MISS KIM TURNED UP IN KOREA.

FOREIGN MOVIE/"HELLO LEE BYUNG HAN" 2005/05/27 ON SALE (RSS)   MATCHING DEGREE: 14.73
VERY TOPICAL LOVE COMEDY ON DVD FOR THE FIRST TIME. VERY IMPRESSIVE.

WHAT LEE BYUNG HAN TALKED AND DID NOT TALK (EPG)   MATCHING DEGREE: 10.33
LEE BYUNG HAN TALKED AND DID NOT TALK ABOUT THE CONTENTS OF THE MOVIE FEATURING HIM.

INFORMATION ON LEE BYUNG HAN

FIG. 16

BASE CONTENT

FEATURING LEE BYUNG HAN × TOKO HASEGAWA. /BEAUTIFUL FISHING (RSS)

LEE BYUNG HAN AND TOKO HASEGAWA WENT TO KOREA, HONG KONG AND JAPAN. WITH SUPERB FISHING TALENT, THEY DID NOT GET CABRILLA.

⇒ SEARCH RELATED EVENT

⇑ FURTHER SEARCH CONTENTS WITH TOP SEARCH RESULT AS A BASE

SEARCH RESULT

MR. BYUNG'S NEW MOVIE "HARD FISHING" (RSS)  MATCHING DEGREE: 14.83

KOREAN STAR LEE BYUNG HAN CURRENTLY SPOTLIGHTED TURNED UP IN PREVIEW OF THE LATEST MOVIE "HARD FISHING" WITH MISS KIM. ONLY MISS KIM TURNED UP IN KOREA.

FOREIGN MOVIE/"HELLO LEE BYUNG HAN" 2005/05/27 ON SALE (RSS)  MATCHING DEGREE: 14.73

VERY TOPICAL LOVE COMEDY ON DVD FOR THE FIRST TIME. VERY IMPRESSIVE.

WHAT LEE BYUNG HAN TALKED AND DID NOT TALK (EPG)  MATCHING DEGREE: 10.33

LEE BYUNG HAN TALKED AND DID NOT TALK ABOUT THE CONTENTS OF THE MOVIE FEATURING HIM.

INFORMATION ON LEE BYUNG HAN

PROCESSING APPARATUS AND ASSOCIATED METHODOLOGY FOR KEYWORD EXTRACTION AND MATCHING

CROSS REFERENCES TO RELATED APPLICATIONS

The present invention contains subject matter related to Japanese Patent Application JP 2006-035312 filed in the Japanese Patent Office on Feb. 13, 2006, the entire contents of which are incorporated herein by reference.

BACKGROUND OF THE INVENTION

1. Field of the Invention

The present invention relates to an information processing apparatus and method, and a program, and, more particularly, to an information processing apparatus and method, and a program which can calculate the degree of matching between contents based on scores of common keywords.

2. Description of the Related Art

There is a related art which, a content being an input, searches for contents relating to the input content.

For example, JP-A-2005-115790 discloses a technique of displaying a program, extracting keywords relating to the displayed program, searches contents, such as Web pages, based on keywords selected from a list of the extracted keywords by a user, and displaying a predetermined content obtained as a search result. That is, according to the technique, with a content or a program being an input, contents, such as Web pages, are searched.

In such a content search, in a case of calculating the degree of matching to be a criterion in selecting a content to be output as a search result based on scores set for keywords extracted from a content to be a base of the search and scores set for keywords extracted from contents to be searched (candidate contents to be selected as a search result), for example, it may be possible to calculate a more preferable degree of matching in consideration of the scores of the keywords as the criterion for selecting the content of the search result, as compared with a case where a content from which a same keyword as included in the keywords extracted from the base content is extracted is selected as the content of the search result and a case where a content from which a greater number of same keywords as included in the keywords extracted from the base content are extracted is selected as the content of the search result.

SUMMARY OF THE INVENTION

It is therefore desirable to be able to calculate the degree of matching between contents based on scores of common keywords.

An information processing apparatus according to an embodiment of the present invention includes an acquisition unit acquiring keywords extracted from text data representing a first content to be a base of a search and scores of the respective keywords, and keywords extracted from text data representing a second content for calculating a degree of matching with the first content, and scores of the respective keywords; a matching-degree calculation unit calculating the degree of matching between the first content and the second content based on scores of keywords commonly included in the keywords extracted from the text data representing the first content and the keywords extracted from the text data representing the second content, both keywords relating to the first content and the second content being acquired by the acquisition unit; and an output unit outputting, as a search result, information on a predetermined number of the second content which has high degrees of matching with the first content based on a result of calculation performed by the matching-degree calculation unit.

The matching-degree calculation unit can be configured to multiply the scores of the keywords commonly included in the keywords extracted from the text data representing the first content and the keywords extracted from the text data representing the second content, and calculates, as the degree of matching between the first content and the second content, a value obtained by adding results of multiplications of the scores of the commonly included keywords.

The information processing apparatus can be configured to further include a keyword extraction unit extracting keywords from text data and calculating scores of the extracted keywords. In this case, the acquisition unit can be configured to acquire keywords extracted from the text data representing the first content and the second content, and scores of the respective keywords.

The keyword extraction unit can be configured to calculate a score of each keyword based on at least one of a frequency of occurrence of a keyword in text data, a position of occurrence of the keyword in the text data, and an attribute of the keyword.

The acquisition unit can be configured to further acquire keywords extracted from text data representing the first content and scores of the respective keywords, and keywords extracted from text data representing the second content and scores of the respective keywords, with a predetermined content in the second content whose degree of matching with the first content is calculated being the first content to be a base of a search, the matching-degree calculation unit can be configured to calculate the degree of matching between the first content and the second content based on scores of keywords commonly included in the keywords extracted from the text data representing the first content and the keywords extracted from the text data representing the second content, both keywords relating to the first content and the second content being acquired by the acquisition unit, and the output unit can be configured to output, as a search result, information on a predetermined number of the second content which has high degrees of matching with the first content which is the predetermined content, based on a result of calculation performed by the matching-degree calculation unit.

An information processing method or a program according to an embodiment of the present invention includes the steps of acquiring keywords extracted from text data representing a first content to be a base of a search and scores of the respective keywords, and keywords extracted from text data representing a second content for calculating a degree of matching with the first content, and scores of the respective keywords; calculating the degree of matching between the first content and the second content based on scores of keywords commonly included in the acquired keywords extracted from the text data representing the first content and the acquired keywords extracted from the text data representing the second content; and outputting, as a search result, information on a predetermined number of the second content which have high degrees of matching with the first content based on a result of calculation.

According to the embodiment of the present invention, keywords extracted from text data representing a first content to be a base of a search and scores of the respective keywords, and keywords extracted from text data representing a second content for calculating a degree of matching with the first content, and scores of the respective keywords are acquired, and the degree of matching between the first content and the second content is calculated based on scores of keywords commonly included in the acquired keywords extracted from the text data representing the first content and the acquired keywords extracted from the text data representing the second content. Information on a predetermined number of the second content which has a high degree of matching with the first content is output as a search result based on a result of calculating the degree of matching.

According to the embodiment of the present invention, the degree of matching between contents can be calculated based on the scores of common keywords.

BRIEF DESCRIPTION OF THE DRAWINGS

FIG. 15 is a diagram for explaining a process of repeating the related content search;

FIG. 16 is another diagram for explaining a process of repeating the related content search;

DETAILED DESCRIPTION OF THE PREFERRED EMBODIMENTS

Figure 1:
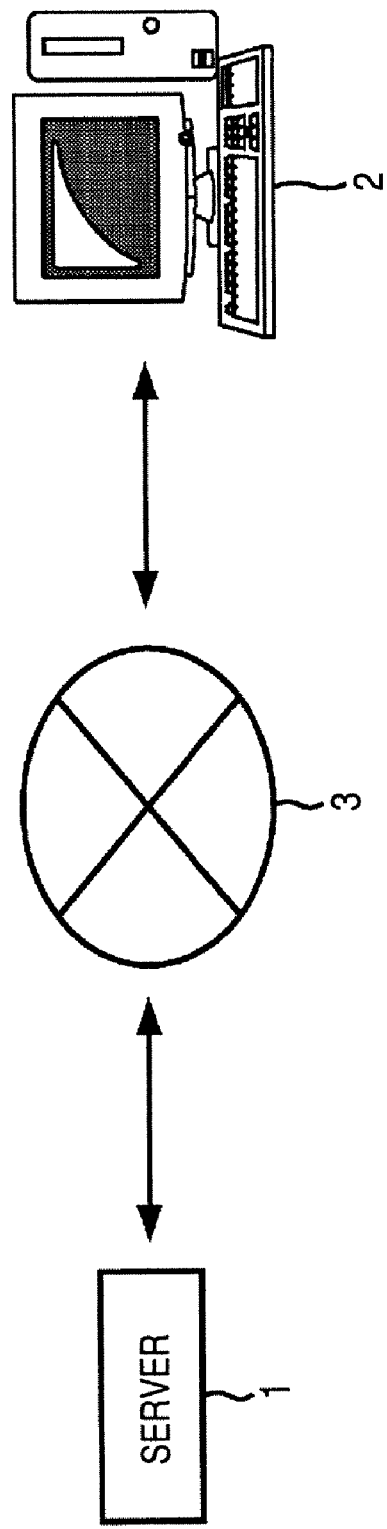
FIG. 1 is a diagram showing an example of the configuration of a content search system according to one embodiment of the present invention.

An embodiment of the present invention will be described below with reference to the accompanying drawings. The correlation between the structural elements of the present invention, and an embodiment described in the specification or illustrated in the drawings is exemplified as follows. The description is for confirming an embodiment which support the present invention are described or illustrated in the specification or the drawings. Therefore, even if there is any other embodiment not described herein as one corresponding to the structural elements of the present invention while such an embodiment is described or illustrated in the specification or the drawings, it does not mean that the embodiment does not correspond to the structural elements. Even if an embodiment is described herein as one corresponding to the present invention, by contrary, it does not mean that the embodiment does not correspond to other structural elements.

An information processing apparatus according to an embodiment of the present invention (e.g., a server 1 in FIG. 1) includes an acquisition unit (e.g., a keyword extracting unit 102 in FIG. 11) which acquires keywords extracted from text data representing a first content to be a base of a search and scores of the respective keywords, and keywords extracted from text data representing a second content for calculating a degree of matching with the first content, and scores of the respective keywords, a matching-degree calculation unit (e.g., a matching degree calculating unit 105 in FIG. 11) which calculates the degree of matching between the first content and the second content based on scores of keywords commonly included in the keywords extracted from the text data representing the first content and the keywords extracted from the text data representing the second content, both keywords relating to the first content and the second content being acquired by the acquisition unit, and an output unit (e.g., an output unit 106 in FIG. 11) which outputs, as a search result, information on a predetermined number of the second content which has high degrees of matching with the first content based on a result of calculation performed by the matching-degree calculation unit.

The information processing apparatus can be provided with a keyword extraction unit (e.g., a keyword extraction engine 73 in FIG. 8) which extracts keywords from text data and calculating scores of the extracted keywords.

Figure 14:
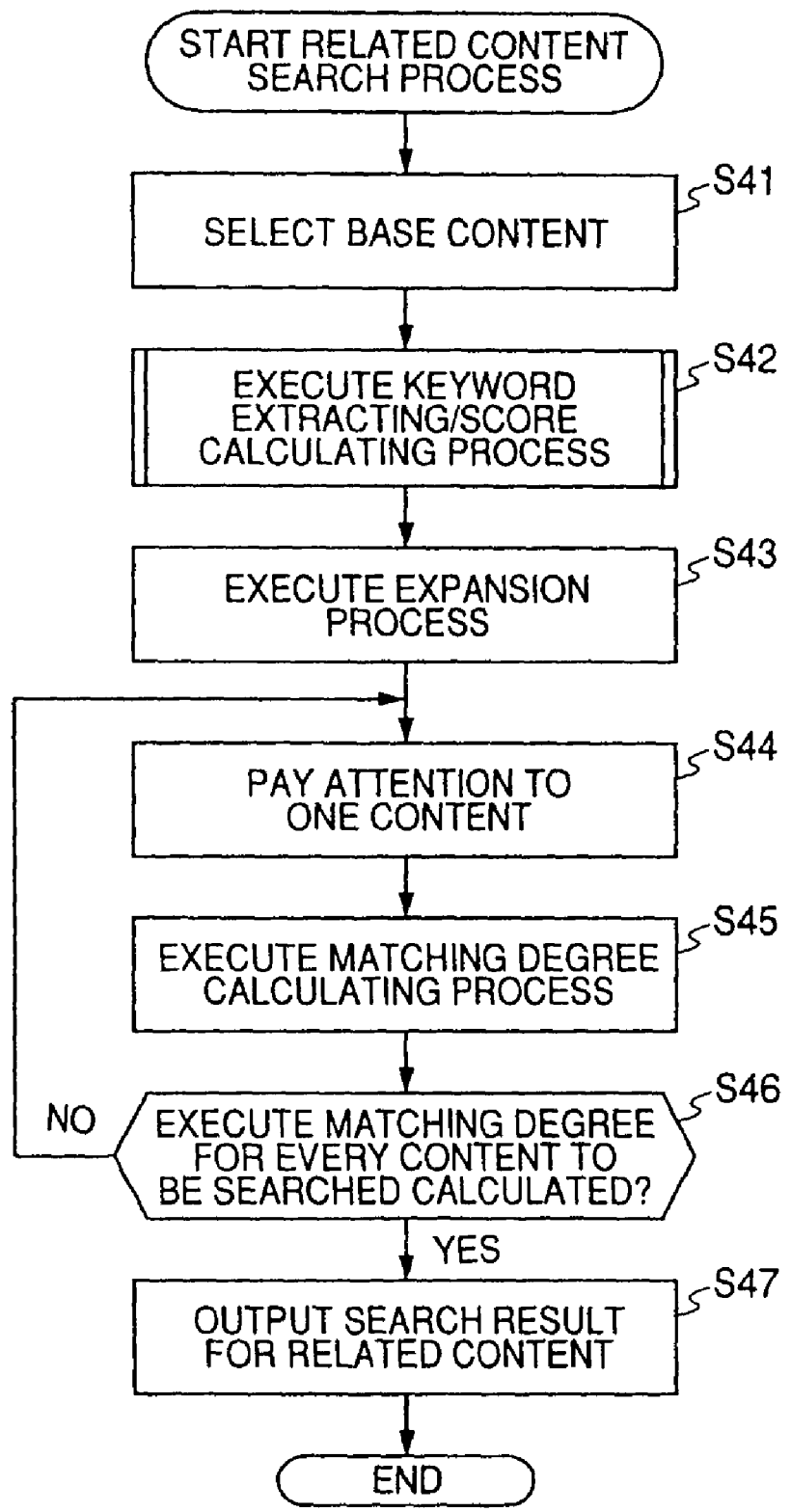
FIG. 14 is a flowchart for explaining a related content search process of the server.

An information processing method or a program according to an embodiment of the present invention includes the steps of acquiring keywords extracted from text data representing a first content to be a base of a search and scores of the respective keywords, and keywords extracted from text data representing a second content for calculating a degree of matching with the first content, and scores of the respective keywords; calculating the degree of matching between the first content and the second content based on scores of keywords commonly included in the acquired keywords extracted from the text data representing the first content and the acquired keywords extracted from the text data representing the second content; and outputting, as a search result, information on a predetermined number of the second content which has high degrees of matching with the first content based on a result of calculation (e.g., step S47 in FIG. 14).

An embodiment of the present invention will be described below with reference to the accompanying drawings.

FIG. 1 is a diagram showing an example of the configuration of a content search system according to one embodiment of the present invention.

As shown in FIG. 1, the content search system is configured by connecting a server 1 to a client PC (Personal Computer) 2 over a network 3 such as the Internet.

As will be described in detail later, the server 1 manages index data which is indexes of contents generated based on text data representing various contents. Referring to the managed index data, the server 1 searches for contents related to a content selected by the user of the client PC 2, and provides the client PC 2 with a search result.

The index data includes data which associates a plurality of keywords extracted from text data representing a content with scores of the respective keywords, and is generated content by content. A score is calculated based on at least one of attributes of a keyword, such as the frequency of occurrence of the keyword in text data, the position of occurrence of the keyword in the text data, and the part of speech.

Index data including such data is generated for contents, such as television programs to be broadcast through terrestrial broadcasting, BS (Broadcasting Satellite)/CS (Communications Satellite) broadcasting or the like, RSS (Resource Description Framework Site Summary) type information like pieces of news or commentaries (hereinafter referred to as "RSS articles" when desired), distributed various portal sites or the like, pieces of music sold in package by means of CDs (Compact Disks), and movies sold in package by means of DVDs (Digital Versatile Discs).

For example, as text data representing the content of a television program, an EPG (Electronic Program Guide) describing the title of the program, featuring persons, genre, the outline, etc. is used, and index data of the television program is generated based on the EPG.

As text data representing the content of an RSS article, data (text data) constituting the article and distributed from the server is used, and index data of the RSS article is generated based on the data.

As text data representing the content of a piece of music, information, such as the title of the piece of music, the name of an artist thereof, and genre, described in attribute information of the content of the piece of music or prepared in a predetermined server on the network 3, is used, and index data of the piece of music is generated based on the data.

As text data representing the content of a movie, information, such as the title of the movie, the names of featuring persons, and genre, described in attribute information of the content of the movie or prepared in a predetermined server on the network 3, is used, and index data of the movie is generated based on the data.

Because closed caption data (caption data which is displayed on the screen according to the display of a video image) also represents the content of a television program or a movie, this data is used as original data for generating index data of a television program or a movie.

The server 1 manages the aforementioned text data itself which represents a content. The aforementioned text data which represents a content and based on which index data is generated will be called "original data" hereinafter.

Figure 2:
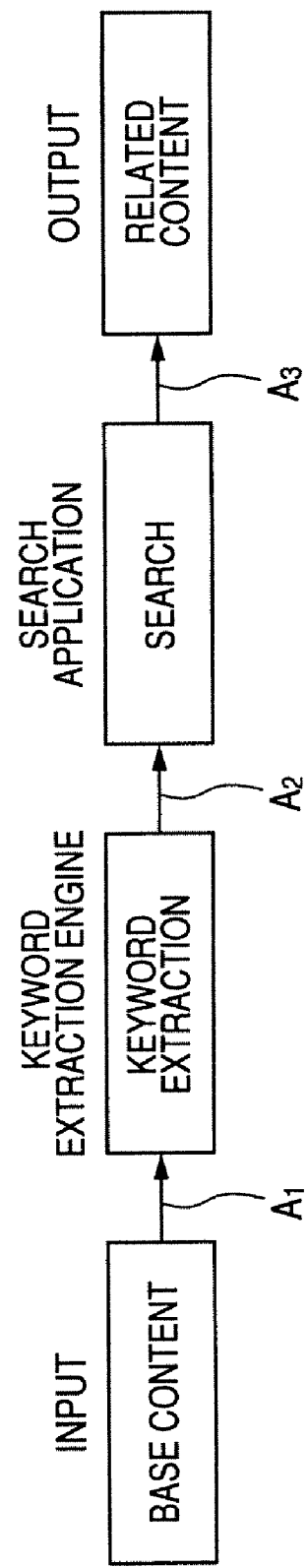
FIG. 2 is a diagram showing an example of a flow of searching contents.

Contents are searched in the server 1 in a way illustrated in, for example, FIG. 2 by using index data which is managed in the aforementioned manner.

When the user of the client PC 2 has selected a content to be a base of a search (base content) as shown at the left-hand end in FIG. 2, keywords are extracted from original data of the base content in the server 1 as indicated by the head of a solid line arrow A1, and the scores of the extracted keywords are calculated. The server 1 manages original data of various contents as mentioned above, and the managed original data includes original data of the base content selected by the user of the client PC 2.

When the keywords are extracted and the scores of the extracted keywords are calculated, contents are searched for in the server 1 based on the keywords and the scores as indicated by the head of a solid line arrow A2.

For example, of the contents whose index data is managed, those contents whose index data includes a same keyword(s) as included in the keywords extracted from the original data of the base content are searched for, and the degree of matching of each of the searched contents with the base content is calculated. The calculation of the degree of matching is executed based on the scores of keywords commonly included in the keywords included in the index data of a content of interest (a single content of interest in the contents whose index data includes a same keyword(s) as included in the keywords extracted from the original data of the base content), and the keywords extracted from the original data of the base content.

When the degrees of matching of the searched contents are calculated, a predetermined number of a content which has a high degree of matching with the base content are supplied to the client PC 2 as related contents as indicated by the head of a solid line arrow A3.

As shown in FIG. 2, the extraction of keywords and the calculation of the scores thereof are executed by a keyword extraction engine in software prepared in the server 1, and a search for related contents which is executed based on the result of the processing done by the keyword extraction engine is carried out by a search application.

As described above, by merely selecting a content to be a base of a search, the user of the client PC 2 can allow the server 1 to search for preferable contents in consideration of the scores of keywords included in the original data of the content and the scores of keywords included in the original data of the contents to be searched (contents whose index data is managed in the server 1).

Returning to FIG. 1, the client PC 2 which allows the server 1 to execute the above-described process is equipped with a browser. The user of the client PC 2 can select the aforementioned base content on the browser screen, or check a list of related contents presented as a search result.

A description will be given below of examples of screens to be displayed on the display of the client PC 2.

Figure 3:
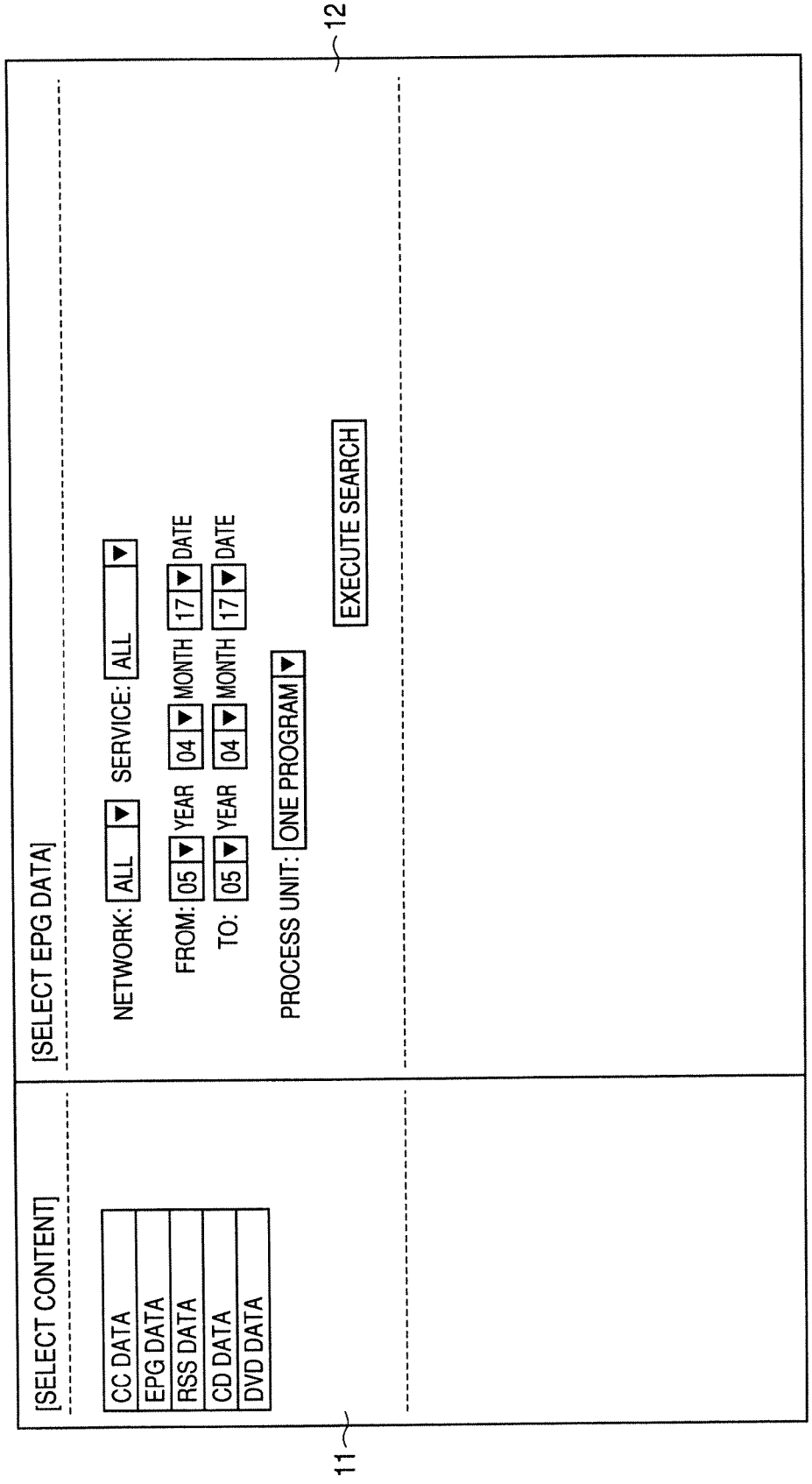
FIG. 3 is a diagram showing an example of a selection screen of a base content.

FIG. 3 is a diagram showing an example of a selection screen of a base content.

The selection screen of the base content includes, for example, a display area 11 on which information used when selecting the category of the base content is displayed and a display area 12 on which information used when making more detailed selection for selecting the base content is displayed.

In the example in FIG. 3, characters "CC Data" (Closed Caption Data), "EPG data", "RSS Data", "CD Data" and "DVD Data" are displayed in the display area 11, and as the user of the client PC 2 moves the cursor to select a predetermined item with a mouse or the like, the category of the base content can be selected from closed caption data, a television program whose information is described in the EPG, an RSS article, music and movie.

Any type of data may be handled as a base content and a content to be searched as long as the content of the data are expressed by text data or include text data itself so that closed caption data can also be selected as a base content.

Characters "Select EPG Data" are displayed at an upper left portion in the display area 12 in FIG. 3. That is, the screen of FIG. 3 exemplifies a case where "Select EPG Data" is selected as the category of the base content from categories displayed in the display area 11. The user can select a predetermined broadcasting from a plurality of broadcastings (services) or select a date to display a program table from the display of the display area 12 in FIG. 3.

When a predetermined broadcasting from and a date are selected, a program guide of programs to be broadcast from the selected broadcasting on the selected date is displayed in the display area 12. The user can select a television program to be a base content from the program guide.

Figure 4:
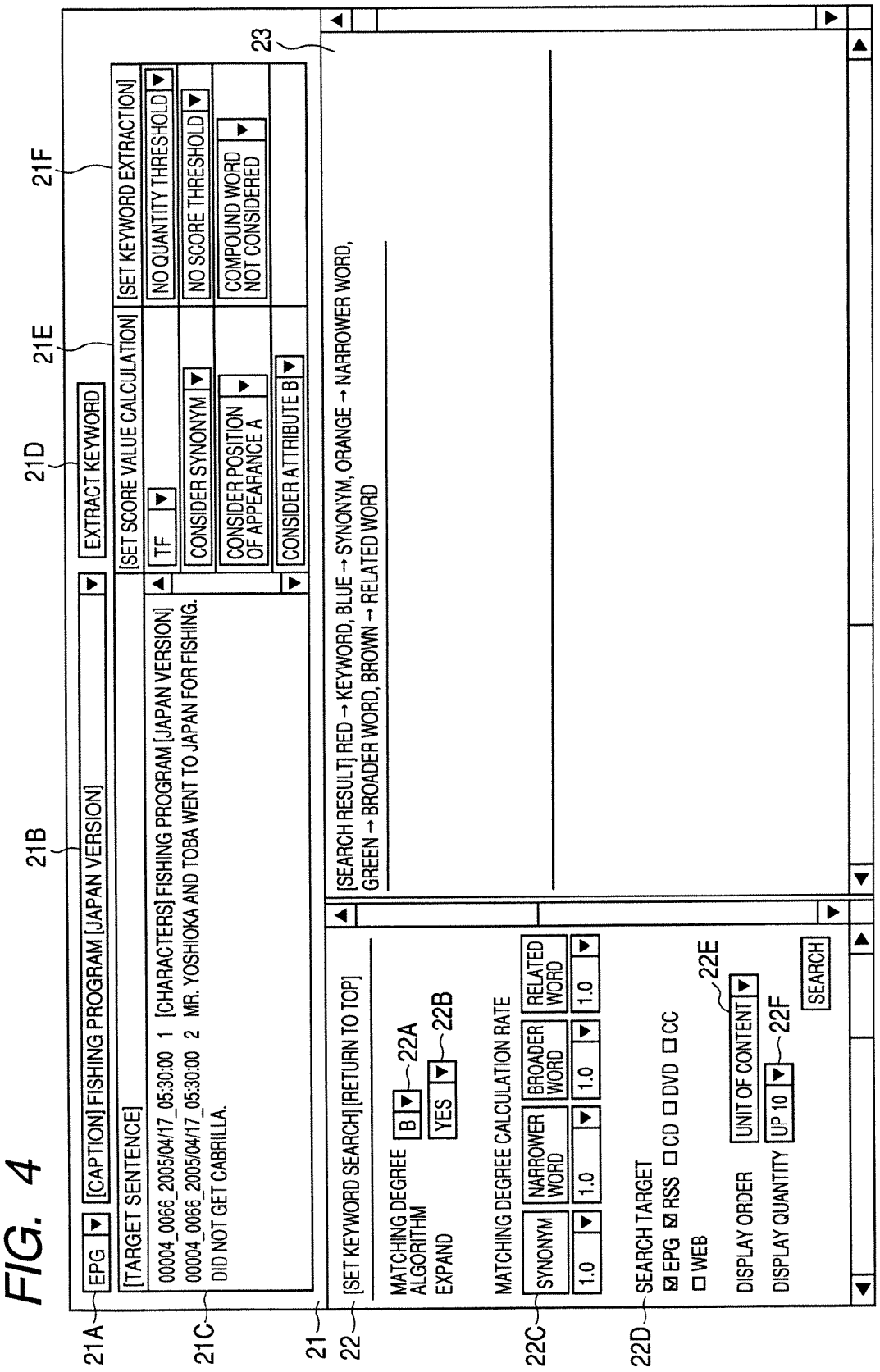
FIG. 4 is a diagram showing an example of a search setting screen.

FIG. 4 is a diagram showing an example of a search setting screen. The setting screen is displayed in place of the screen of FIG. 3, for example, when a base content is selected.

As shown in FIG. 4, the search setting screen includes, for example, a display area 21 on which information on the base content selected by the user is displayed, a display area 22 on which information on the setting of keywords to be used in searching for related contents is displayed, and a display area 23 on which a search result is displayed.

A category display field 21A where the category of the base content is shown is displayed in the display area 21, and a title display field 21B where the title of the base content is shown is displayed right to the category display field 21A. In the example of FIG. 4, "EPG" is shown in the category display field 21A, and [caption] fishing program [Japan version] is shown in the title display field 21B. That is, the screen of FIG. 4 exemplifies a case where a television program with the title [caption] fishing program [Japan version] is selected as a base content from programs listed up in the program guide.

Displayed under the category display field 21A and the title display field 21B is a target sentence display field 21C where text data (original data) representing a base content is shown. In the example of FIG. 4, text data described in the EPG, such as the broadcast date, broadcast start time, title and outline, is displayed in the target sentence display field 21C. Depressing a button 21D shown right to the title display field 21B, the user can cause the server 1 to extract keywords from text data displayed in the target sentence display field 21C and calculate the scores thereof.

A score value calculation setting field 21E is shown right to the target sentence display field 21C, so that the user can make setting on the calculation of scores from the display of the score value calculation setting field 21E. In the example of FIG. 4, the user sets the calculation of each score in consideration of the occurrence frequency (TF (Task Frequency)), the synonym, the position of occurrence, and the attribute of a keyword. The content of the setting will be described later as needed.

A keyword extraction setting field 21F is shown right to the score value calculation setting field 21E, so that the user can make setting on the extraction of keywords from the display of the keyword extraction setting field 21F. In the example of FIG. 4, the user sets the extraction of keywords without providing the threshold of the number of keywords to be extracted and without considering scores and compound words.

A matching degree algorithm field 22A where information on an algorithm to calculate the degree of matching is displayed in the display area 22. An expansion field 22B where information on the expansion of keywords is displayed under the matching degree algorithm field 22A. In the example of FIG. 4, the matching degree algorithm field 22A shows "B" (which means to calculate the degree of matching with an algorithm identified by "B1"), and the expansion field 22B shows the execution of the expansion of keywords ("Yes").

Displayed under the expansion field 22B is a matching degree calculation rate field 22C where information on coefficients to be used in calculating the degree of matching is shown. Displayed under the matching degree calculation rate field 22C is a search target field 22D where information on the range of contents to be searched (searching contents) is shown. In the example of FIG. 4, the matching degree calculation rate field 22C shows each coefficient of "1.0", and the search target field 22D shows that a search is executed for television programs and RSS articles from among a group of television programs (EPG), RSS articles (RSS), pieces of music (CD), movies (DVD), closed caption data (CC) and Web contents (Web).

Displayed under the search target field 22D is a display order field 22E where information on the display order of the search results is shown. Displayed under the display order field 22E is a display quantity field 22F where information on the number of displays of the search results is shown. In the example of FIG. 4, the display order field 22E shows the search results in the unit of contents, and the display quantity field 22F shows that up to ten contents are displayed as search results.

When the button 21D shown in the display area 21 is depressed, the server 1 extracts keywords and calculates the scores thereof according to what is set in the foregoing fields. When extraction of keywords and calculation of scores are executed, the server 1 transmits the results to the client PC 2.

Figure 5:
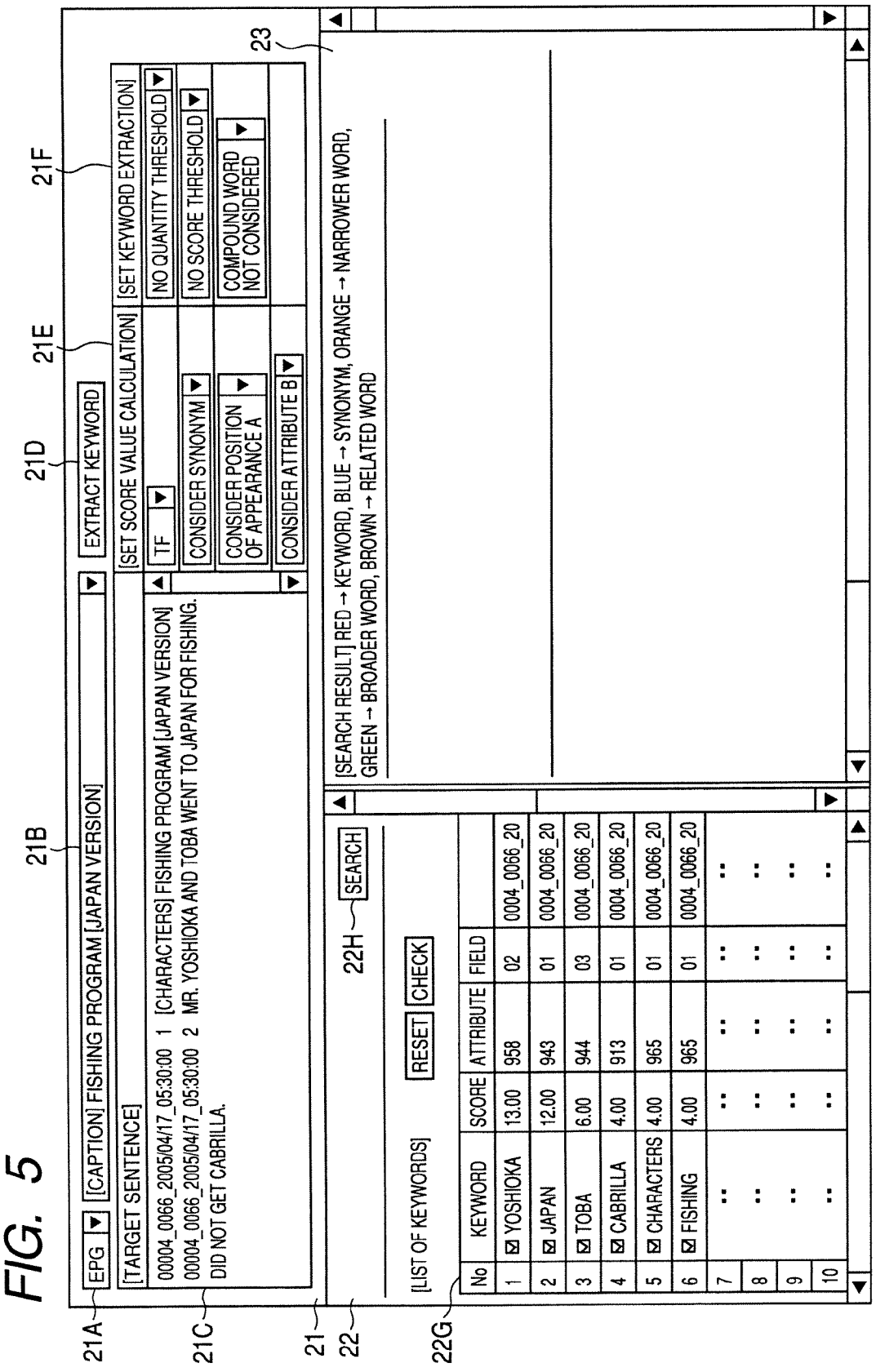
FIG. 5 is a diagram showing an example of the display screen of the results of extracting keywords.

FIG. 5 is a diagram showing an example of the display screen of the results of extracting keywords. The display screen is displayed in place of the screen of FIG. 4 when the button 21D is depressed.

The screen shown in FIG. 5 is similar to the screen of FIG. 4 except that a list 22G of keywords extracted from the original data of the base content is displayed in the display area 22.

In the example of FIG. 5, keywords, such as "Yoshioka", "Japan", "Toba", and "cabrilla", are extracted from the original data (text data shown in the target sentence display field 21C) of the television program "[caption] fishing program [Japan version]", and a list of the keywords is shown.

A score, an attribute, etc. are shown next to each keyword. For example, in the example of FIG. 5, the score of "Yoshioka" is "13.00", and the score of "Japan" is "12.00". The score of "Toba" is "6.00", and the score of "cabrilla" is "4.00". The score is considered in calculating the degree of matching.

Further, a check box is shown left to each keyword, so that the user checks on or off the check box to select a keyword to be used in searching for related contents.

With the screen shown in FIG. 5 being displayed, when the user depresses a button 22H shown at an upper right portion of the display area 22, the server 1 searches for related contents by referring to keywords checked as being used in the search and the scores of the keywords. When the search for related contents is carried out, the search results are transmitted from the server 1 to the client PC 2.

Figure 6:
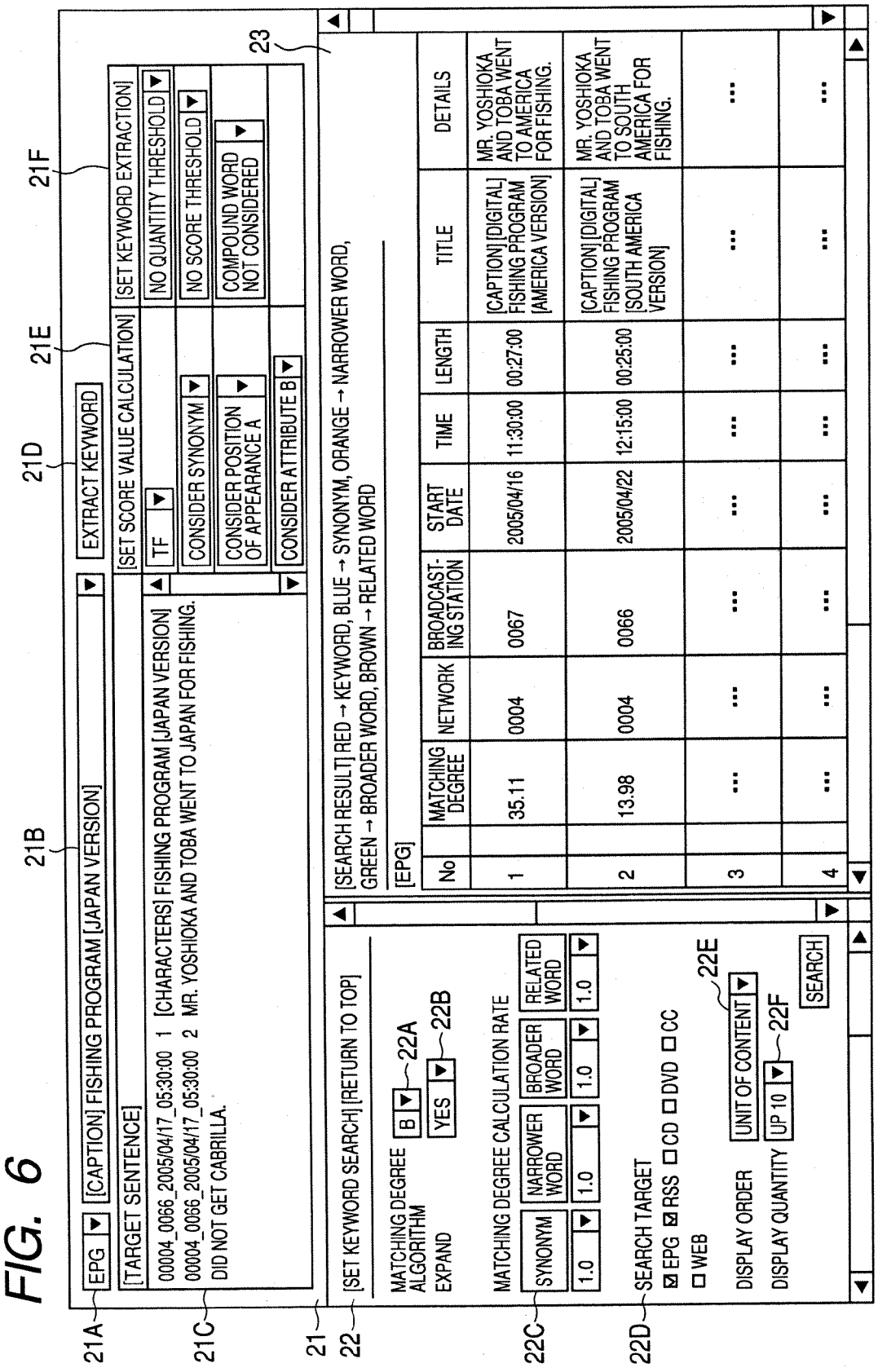
FIG. 6 is a diagram showing an example of the display screen of the results of searching for related contents.

FIG. 6 is a diagram showing an example of the display screen of the results of searching for related contents. This display screen is displayed in place of the screen of FIG. 5 when the button 22H is depressed and the search results for related contents are transmitted from the server 1.

When the search results for related contents are transmitted from the server 1, a list of related contents is displayed in the display area 23 as shown in FIG. 6. The display of the display area 22 is the same as the display of the display area 22 in FIG. 4, and the display of the display area 21 is the same as having displayed so far.

In the example of FIG. 6, the television program "[caption] [digital] fishing program [America version]" and the television program "[caption] [digital] fishing program [South America version]" are displayed as search results for related contents. As information on the related contents, the degree of matching, Network, broadcasting station, broadcast start date, broadcast start time, broadcasting time, title and details are shown. The degree of matching between the base content and the former program is "35.11" while the degree of matching between the base content and the latter program is "13.98".

From the search results displayed this way, the user can confirm, for example, the degree of matching of a content selected as the base content with each related content.

The process of the server 1 to present the search results for related contents to the user of the client PC 2 through the above-described screen displays will be described later referring to the flowchart.

Figure 7:
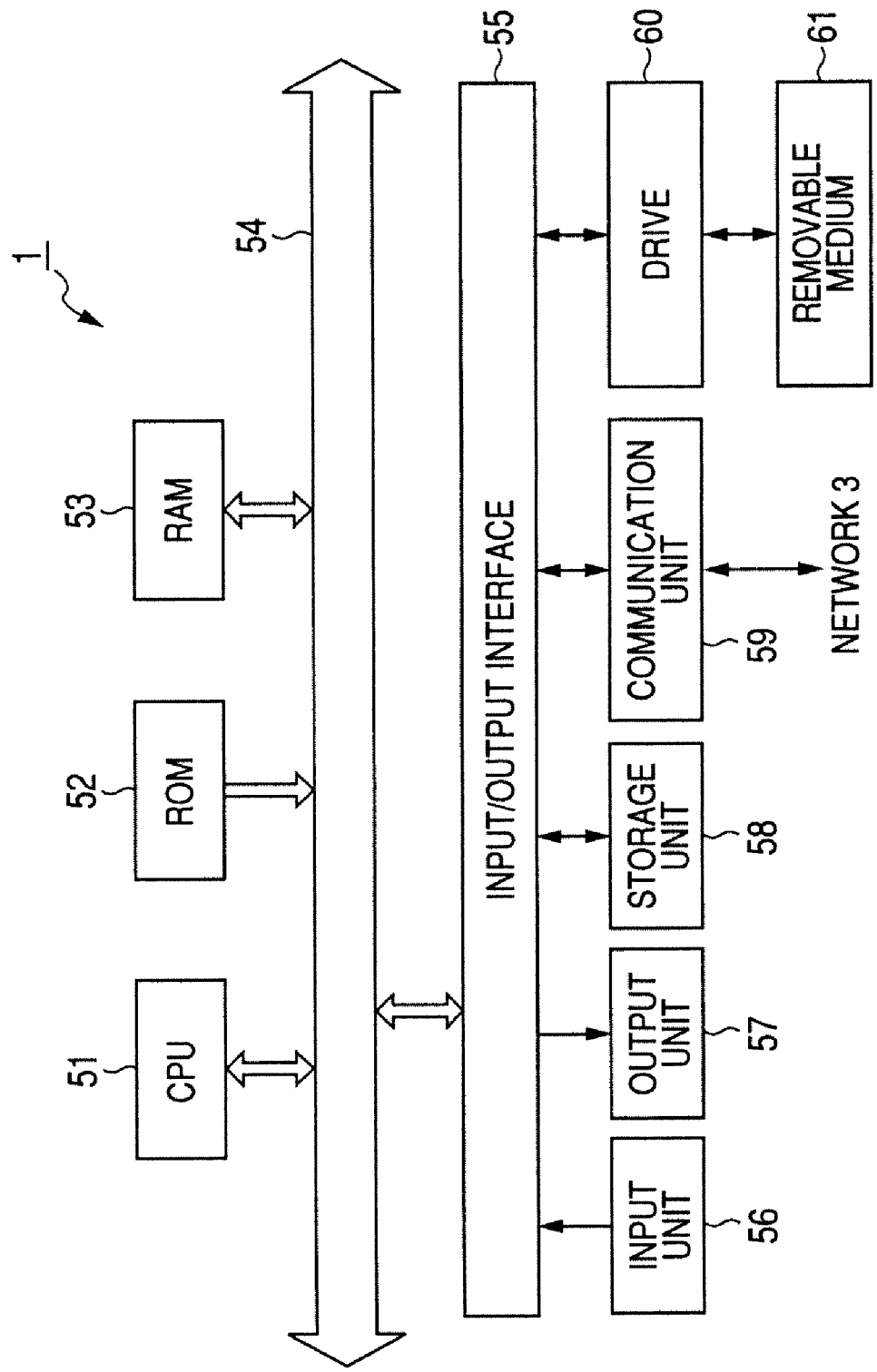
FIG. 7 is a block diagram showing an example of the hardware configuration of a server.

FIG. 7 is a block diagram showing an example of the hardware configuration of the server 1.

A CPU (Central Processing Unit) 51 executes various processes according to programs stored in a ROM (Read Only Memory) 52 or a storage unit 58. A RAM (Random Access Memory) 53 stores a program which is executed by the CPU 51 and data as needed. The CPU 51, ROM 52 and RAM 53 are connected to one another by a bus 54.

The CPU 51 is also connected with an input/output interface 55 by the bus 54. The input/output interface 55 is connected with an input unit 56 including a keyboard, a mouse and a microphone, and an output unit 57 including a display and a speaker. The CPU 51 executes various processes in response to instructions input from the input unit 56.

The storage unit 58 connected to the input/output interface 55 includes, for example, a hard disk, and stores programs which are executed by the CPU 51 and various kinds of data. A communication unit 59 communicates with an external device, such as the client PC 2, over the network 3.

A drive 60 connected to the input/output interface 55 drives a removable medium 61, such as a magnetic disk, an optical disk, magneto-optical disk or a semiconductor memory, when mounted, and acquires a program and data stored therein. The read program and data are transferred to the storage unit 58 and stored therein as needed.

Figure 8:
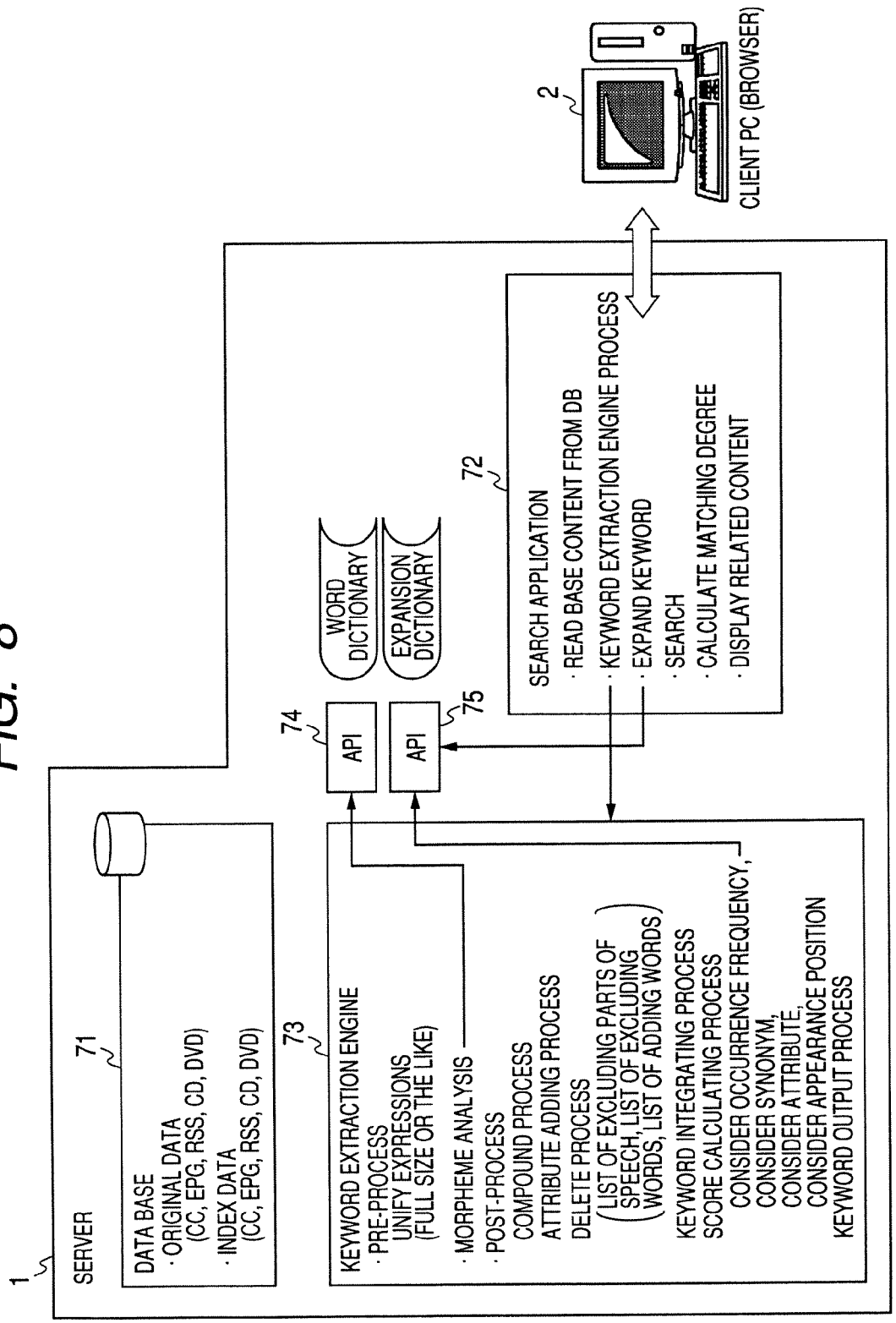
FIG. 8 is a diagram showing an example of the software configuration of the server.

FIG. 8 is a diagram showing an example of the software configuration of the server 1.

As shown in FIG. 8, the server 1 is provided with a search application 72 and a keyword extraction engine 73. Basically, those two pieces of software can realize a search for related contents with a content selected by the user of the client PC 2 being a base. The server 1 is also provided with a data base 71 for data to be used in searching for related contents.

The data base 71 stores original data which is text data representing the contents closed caption data, television programs, RSS articles, pieces of music and movies, and index data of the contents which is generated based on the original data. The generation of index data based on original data is executed by the keyword extraction engine 73 beforehand, for example, before the client PC 2 requests a search for related contents.

The search application 72 communicates with the client PC 2 over the network 3, reads original data of a base content as a base for a search, when selected by the user of the client PC 2, from the data base 71, and outputs the original data to the keyword extraction engine 73 so that the keyword extraction engine 73 executes extraction of keywords and calculation of scores thereof. When the original data of the base content is provided by the client PC 2, the original data may be supplied to the keyword extraction engine 73.

In extracting keywords, the search application 72 causes an expansion module to expand the keywords extracted from the original data of the base content via an API (Application Programming Interface) 75 as needed, and causes the keyword extraction engine 73 to calculate the scores of the expanded keywords too. An expanded keyword is a keyword having a relationship of a synonym, broader word, narrower word or related word with the keyword extracted from the original data of the base content. When a group name of an idle group is extracted as a keyword from the original data of the base content, for example, the names of the members of the idle group are also used in searching for contents as keywords having a narrower-word relationship with the group name extracted from the original data of the base content.

A word having a synonym relationship with a word (word having the same meaning), a word having a broader-word relationship with a word (broader term word), a word having a narrower-word relationship with a word (narrower term word), and a word having a related-word relationship with a word (related word) are associated with each other in an expansion dictionary managed by the expansion module.

The scores of the keywords expanded this way are calculated in consideration of coefficients set in the matching degree calculation rate field 22C on the screen of FIG. 4. For example, a value obtained by multiplying the score set for the keyword of the expansion original (the group name in the aforementioned case) by a coefficient is set as the score of the keyword of an expansion destination (the names of the members in the aforementioned case).

When the keywords and scores as the processing results are supplied from the keyword extraction engine 73, the search application 72 searches contents in the range selected by the user for contents whose index data includes the same keyword as included in the keywords extracted from the original data of the base content.

The search application 72 sequentially pays attention to the contents whose index data includes the same keyword as included in the keywords extracted from the original data of the base content and which have been obtained through the search, and calculates the degree of matching between the content of interest and the base content based on the result of processing done by the keyword extraction engine 73 and the index data of the content of interest.

Figure 9:
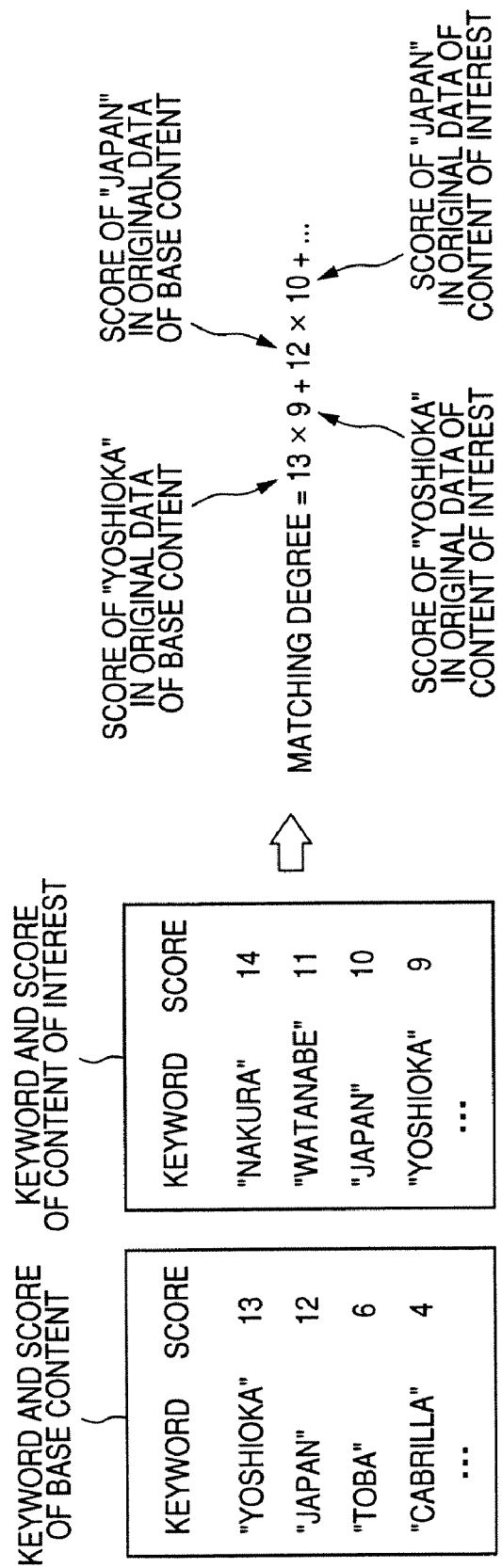
FIG. 9 is a diagram showing an example of calculation of the degree of matching.

FIG. 9 is a diagram showing an example of calculation of the degree of matching.

The left-hand side of FIG. 9 shows keywords acquired by the keyword extraction engine 73 based on the original data of the base content and the scores of the keywords, and the keywords included in the index data of the content of interest, stored in the data base 71, and the scores of the keywords.

In the example of FIG. 9, "Yoshioka", "Japan", "Toba", "cabrilla", etc. are shown as keywords of the base content, and the scores of the keywords are respectively "13.00", "12.00", "6.00" and "4.00". "Nakura", "Watanabe", "Japan", "Yoshioka", etc. are shown as keywords of the content of interest, and the scores of the keywords are respectively "14.00", "11.00", "10.00" and "9.00".

When such keywords and scores are acquired, because the degree of matching is acquired by adding the results of multiplication of the scores of the keywords commonly included, for each of common keywords "Yoshioka" and "Japan", the search application 72 adds the results of multiplication of the score of the common keyword in the original data of the base content by the score of the common keyword in the original data (index data) of the content of interest to calculate the degree of matching as shown on the right-hand side of FIG. 9.

Returning to FIG. 8, when obtaining the degree of matching of every content acquired in the search with the base content, the search application 72 selects a predetermined number of a content, e.g., ten contents, which have high degrees of matching with the base content, and displays a list of the selected content as the search result on the display of the client PC 2.

When the original data of the base content is supplied from the search application 72, the keyword extraction engine 73 executes a process of unifying expressions of the supplied original data (text data) as a pre-process of a morpheme analysis. When text data of an RSS article is supplied as original data, for example, the type and size of a font in the leading part may differ from those in the body, so that the fonts and the sizes are unified to the same font and the same size.

The keyword extraction engine 73 performs the morpheme analysis on the pre-processed text data using the API 74 to separate the text data representing the base content to morphemes (the significant minimum units (words) of a language).

Based on the result of the morpheme analysis, the keyword extraction engine 73 executes a compound process, an attribute adding process, an excluding process, a keyword integrating process, a score calculating process, and a keyword output process in order as post-processes of the morpheme analysis.

The compound process combines a plurality of morphemes into a single morpheme, such as a case where the last name and the first name of a person separated into different morphemes are combined into one morpheme or a case where a morpheme like "company" which is significant in searching for contents if it is combined with a preceding morpheme is combined with the preceding morpheme.

The attribute adding process affixes an attribute like the part of speech to each morpheme. A score is set for a morpheme (word) in consideration of the affixed attribute too.

The excluding process excludes morphemes of parts of speech registered in an excluding part-of-speech list and morphemes (words) registered in the excluding word list, and adds those morphemes which are excluded as they are the morphemes of parts of speech registered in the excluding part-of-speech list but are registered in an adding word list as candidate words to be selected as keywords.

The keyword integrating process integrates the same morphemes into one morpheme.

The score calculating process sets a score to each morpheme based on the occurrence frequency, the occurrence position and the attribute as mentioned above.

In setting a score based on the occurrence frequency, when the same morpheme appears or occurs three times in original data, for example, a score to be given every occurrence is tripled, and the tripled score is given to the morpheme.

In setting a score based on the occurrence position, for example, a higher score is given to a morpheme which appears in the title portion of an RSS article than to a morpheme which appears in the body, the positions in text data are classified into a position for which a high score is given, a position for which an intermediate score is given, and a position for which a low score is given, a high score is given to a morpheme which appears in the title portion of a program guide, an intermediate score is given to a morpheme which appears in the detailed information (outline) portion, and a low score is given to a morpheme which appears in the detailed information (expanded information) portion.

In setting a score based on the attribute, for example, a high score is given to a morpheme of a proper noun or the name of a person, and a lower score is given to a morpheme of a general noun or a verb.

Which one of the occurrence frequency, the occurrence position and the attribute is to be considered in calculating a score is selected by the user of the client PC 2 in the score value calculation setting field 21E on the screen of FIG. 4.

The user of the client PC 2 can also calculate a score in consideration of a synonym. The calculation of a score in consideration of a synonym is to set a single score to a combined morpheme obtained by combining morphemes which are considered as substantially the same word into one morpheme using the expansion dictionary.

A score is set to each morpheme or each keyword in consideration of the aforementioned elements.

The keyword output process outputs the process results with a keyword associated with a score to the search application 72.

The process of the keyword extraction engine 73 is performed not only on the original data of the base content supplied from the search application 72 but also on original data stored in the data base 71 at a given timing. The process on original data stored in the data base 71 causes the index data obtained by the keyword extraction engine 73 to be stored in the data base 71 and used in searching for related contents.

Figure 10:
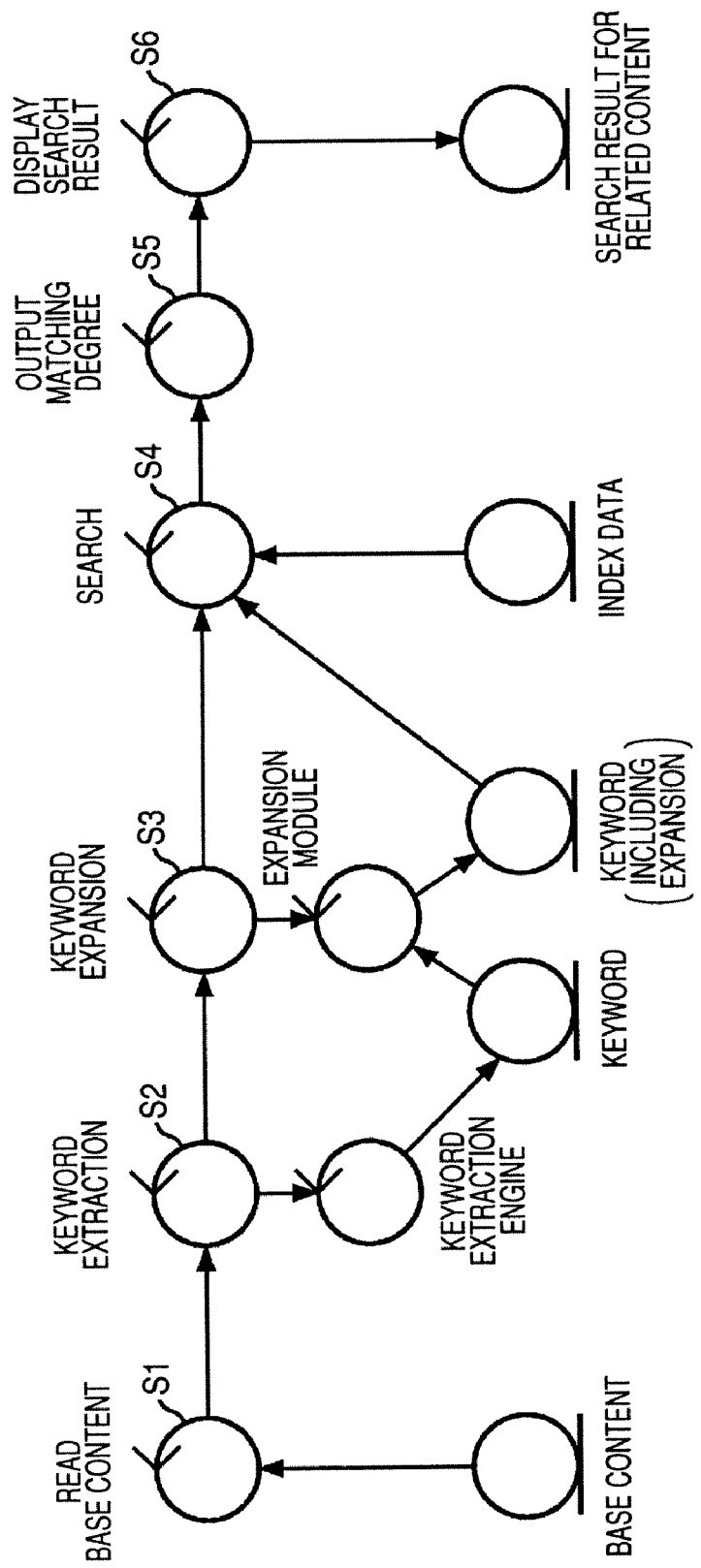
FIG. 10 is a diagram showing another example of a flow of searching contents.

FIG. 10 is a diagram showing the flow of processes that are executed by the search application 72 and the keyword extraction engine 73, and shows the flow in FIG. 2 in more detail.

As a state S1, the search application 72 reads the original data of the base content, and as a state S2, the keyword extraction engine 73 extracts keywords and calculates the scores thereof based on the original data of the base content. As a state S3, the expansion module expands the keywords, and as a state S4, the search application 72 searches for contents referring to index data. As a state S5, the degree of matching is calculated, and as a state S6, the search results are displayed.

Figure 11:
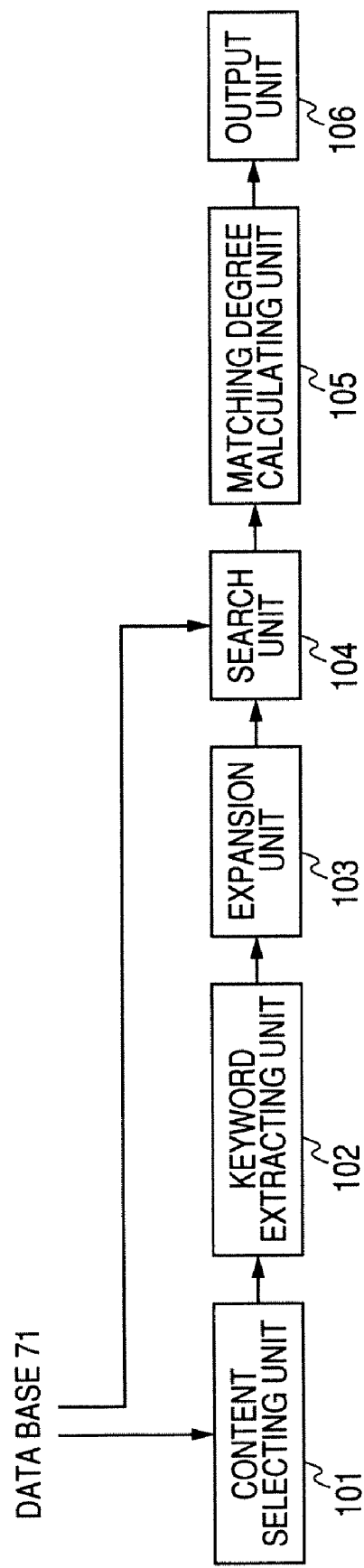
FIG. 11 is a block diagram showing an example of the functional structures of the server.

FIG. 11 is a block diagram showing an example of the functional structures of the server 1. At least a part of the functional portions shown in FIG. 11 is realized by the search application 72 and the keyword extraction engine 73 in FIG. 8.

As shown in FIG. 11, a content selecting unit 101, a keyword extracting unit 102, an expansion unit 103, a search unit 104, a matching degree calculating unit 105 and an output unit 106 are realized in the server 1.

When a content to be a base of a search is selected by the client PC 2, the content selecting unit 101 reads original data of the selected base content from the data base 71, and outputs the original data to the keyword extracting unit 102.

When the original data of the base content is supplied from the content selecting unit 101, the keyword extracting unit 102 executes the pre-process, the morpheme analysis and the post-process explained above referring to FIG. 8 to extract keywords from the original data, and calculate the scores of the extracted keywords. The keyword extracting unit 102 outputs the keywords and scores obtained through those processes to the expansion unit 103.

The expansion unit 103 expands the keywords extracted by the keyword extracting unit 102 and calculates the scores of the expanded keywords. The score of each expanded keyword is calculated by multiplying the score of the keyword of the expansion original by a predetermined coefficient set by the user of the client PC 2. The expansion unit 103 sends the search unit 104 the expanded keywords and the scores thereof together with the keywords and the scores thereof supplied from the keyword extracting unit 102.

When the keywords and the scores thereof are supplied from the expansion unit 103, the search unit 104 searches contents in the range designated by the user of the client PC 2 for contents whose index data includes the same keyword as included in the keywords extracted from the original data of the base content, reads the index data (keywords and scores) of the searched contents from the data base 71, and sends the keywords of the base content and the scores thereof together with the index data to the matching degree calculating unit 105.

Sequentially paying attention to the contents searched by the search unit 104, the matching degree calculating unit 105 calculates the degree of matching of a content of interest with the base content based on the data supplied from the search unit 104 in the way explained above referring to FIG. 9. The matching degree calculating unit 105 sends the degree of matching of the content of interest with the base content to the output unit 106.

The output unit 106 selects a predetermined number of a content which has a high degree of matching with the base content based on the data supplied from the matching degree calculating unit 105, and displays a list of the selected contents on the display of the client PC 2. At the time of displaying the results of searching for related contents, original data of the related contents stored in the data base 71 (information displayed in the display area 23 in FIG. 6, such as the title, broadcast date and broadcast start time, when a related content is a television program) is also referred to.

The operation of the server 1 having the above-described configuration will be described below.

Figure 12:
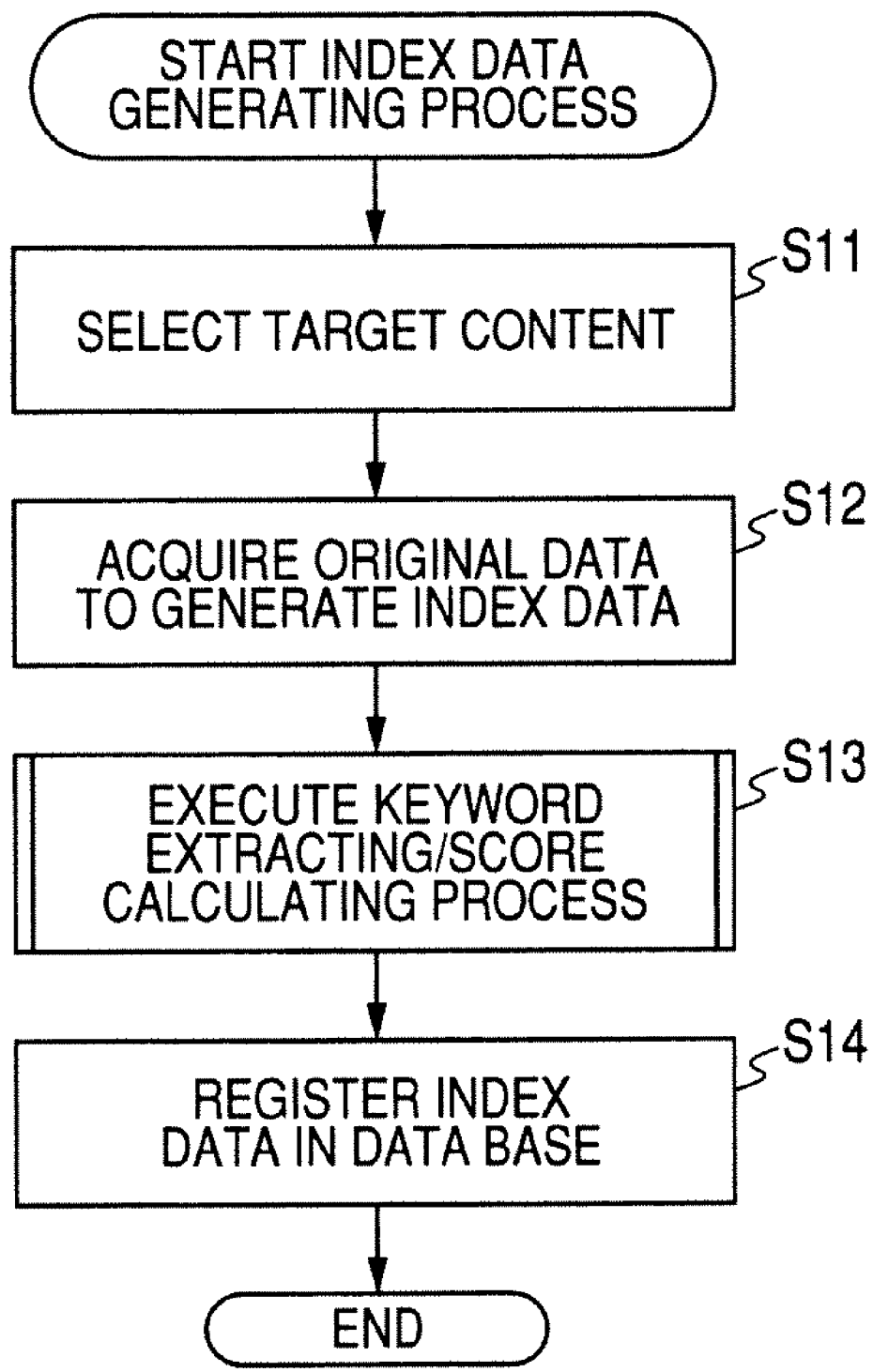
FIG. 12 is a flowchart for explaining an index data generating process of the server.

First, the index data generating process of the server 1 will be explained referring to a flowchart in FIG. 12. This process is executed, for example, before the client PC 2 requests a search for related contents.

In step S11, the content selecting unit 101 selects a content whose index data is to be generated, and proceeds to step S12 to acquire original data from which index data is generated. When original data of a content whose index data is to be generated is stored in the data base 71, for example, the original data is read out from the data base 71. When original data of a content whose index data is to be generated is not stored in the data base 71, the original data may be acquired over the network 3 from a predetermined server which manages the original data. The original data acquired by the content selecting unit 101 is output to the keyword extracting unit 102.

In step S13, the keyword extracting unit 102 executes the keyword extracting/score calculating process. Through the process, keywords are extracted from the original data and the scores of the extracted keywords are calculated. The details of the keyword extracting/score calculating process will be described later referring to a flowchart in FIG. 13.

In step S14, the keyword extracting unit 102 registers data including the keywords and the scores acquired in the keyword extracting/score calculating process, as index data, in the data base 71.

As the above process is repeated for various contents, the data base 71 is provided with index data which can be used in searching for related contents.

Figure 13:
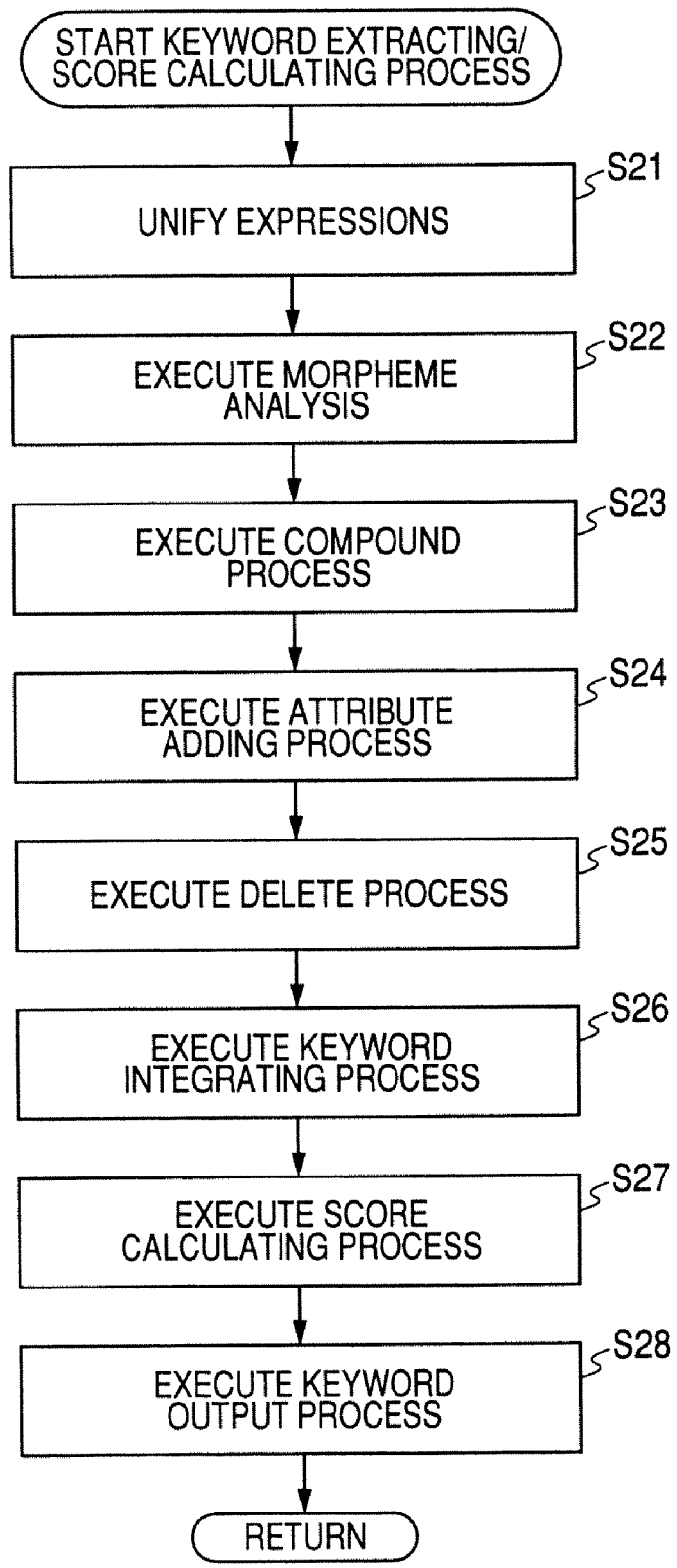
FIG. 13 is a flowchart for explaining a keyword extracting/score calculating process which is executed in step S13 in FIG. 12.

Next, the keyword extracting/score calculating process which is executed in step S13 in FIG. 12 will be explained referring to a flowchart in FIG. 13.

In step S21, when the original data is supplied from the content selecting unit 101, the keyword extracting unit 102 executes a process of unifying expressions of the supplied original data as a pre-process of the morpheme analysis.

The keyword extracting unit 102 performs morpheme analysis on text data having expressions unified in step S21 and separates text data into morphemes in step S22.

In step S23, the keyword extracting unit 102 performs a compound process of combining a plurality of morphemes to a single morpheme, and proceeds to step S24 to affix an attribute to the morpheme obtained by the compound process.

In step S25, the keyword extracting unit 102 executes the excluding process of excluding the morpheme of a part of speech registered in the excluding part-of-speech list and a morpheme (word) registered in the excluding word list, and proceeds to step S26 to execute the keyword integrating process on the remaining morphemes.

In step S27, the keyword extracting unit 102 calculates the scores of keywords, and proceeds to step S28 to output the keywords in association with the scores. Thereafter, the flow returns to step S13 in FIG. 12 and the output keywords and scores are included in index data, which is then registered in the data base 71.

Next, the related content search process of the server 1 will be explained referring to a flowchart in FIG. 14. This process is started when the user of the client PC 2 selects a base content using the screen as shown in FIG. 3.

In step S41, the content selecting unit 101 selects a base content according to an instruction given by the user of the client PC 2, reads original data of the selected base content from the data base 71, and outputs the original data to the keyword extracting unit 102.

In step S42, based on the original data supplied from the content selecting unit 101, the keyword extracting unit 102 executes the keyword extracting/score calculating process. Through the process, keywords are extracted from the original data of the base content and the scores of the extracted keywords are calculated. The keyword extracting unit 102 outputs the acquired keywords and scores to the expansion unit 103. The keyword extracting/score calculating process that is executed here is similar to the process explained above referring to the flowchart in FIG. 13.

In step S43, the expansion unit 103 expands the keywords supplied from the keyword extracting unit 102 and calculates the scores of the expanded keywords. The expansion unit 103 sends the search unit 104 the expanded keywords and the scores thereof together with the keywords and the scores supplied from the keyword extracting unit 102.

In step S44, the search unit 104 searches contents in the range designated by the user of the client PC 2 for contents whose index data includes the same keyword as included in the keywords extracted from the original data of the base content, pays attention to a single content in the contents obtained through the search, and sends the index data of the content of interest together with the keywords of the base content and the scores thereof to the matching degree calculating unit 105.

In step S45, Sequentially paying attention to the contents searched by the search unit 104, the matching degree calculating unit 105 calculates the degree of matching of the content of interest with the base content based on the data supplied from the search unit 104, and proceeds to step S46 to determined whether or not the degree of matching has been calculated for all the contents searched.

When having determined in step S46 that the degree of matching has not been calculated for all the contents, the matching degree calculating unit 105 returns to step S44 to repeatedly execute the sequence of processes at and following step S44. When having determined in step S46 that the degree of matching has been calculated for all the contents, the matching degree calculating unit 105 outputs the degree of matching of the base content with each content to the output unit 106, and then proceeds to step S47.

In step S47, the output unit 106 selects a predetermined number of a content which has a high degree of matching with the base content based on the data supplied from the matching degree calculating unit 105, and displays a list of the selected contents on the display of the client PC 2.

Through the process, the search results for related contents including the degrees of matching with the base content are displayed as shown in FIG. 6.

When the user of the client PC 2 selects the base content, the keyword extraction engine 73 extracts keywords and calculates the scores thereof based on the original data of the selected base content in the foregoing description. In a case where keywords extracted from the original data of the selected base content and scores of the keywords are included in index data which is prestored in the data base 71 in that form, however, the keywords and scores included in index data may be used in searching for contents without executing the process of the keyword extraction engine 73.

Although a predetermined number of a content which has a high degree of matching with the base content are presented to the user of the client PC 2 as the search results in the foregoing description, a search for related contents (related content search) may further be repeated with a predetermined content in the related contents obtained as the search results being a base content, so that a predetermined number of a content which has a high degree of matching with the predetermined content are presented as the search results.

FIG. 15 is a diagram for explaining a process of repeating the related content search.

In the example of FIG. 15, as shown in the upper portion thereof, a related content search is performed with, for example, an RSS article entitled "Featuring Lee Byung Han× Toko Hasegawa . . . " being a base content, and an RSS article entitled "Mr. Byung's New Movie . . . " whose degree of matching with the base content is "14.83", an RSS article entitled "Hello Lee Byung Han . . . " whose degree of matching with the base content is "14.73", a television program entitled "What Lee Byung Han Talked . . . whose degree of matching with the base content is 10.33" are treated as related contents as the search results.

In this case, as shown in FIG. 16, for example, the RSS article entitled "Mr. Byung's New Movie . . . " whose degree of matching with the base content is taken as the base content, the related content search is further executed in a way similar to that done when the RSS article entitled "Featuring Lee Byung Han x Toko Hasegawa . . . . " is taken as the base content.

Accordingly, the user of the client PC 2 can execute a search with broader searching targets with respect to the RSS article entitled "Featuring Lee Byung Han×Toko Hasegawa . . . . ", and can acquire search results for indirectly related contents. While the related content search with the user's selected content being taken as a base as shown in FIG. 15 is to search for those contents which are directly related to the base content, the related content search with a predetermined content in the related contents being taken as a base as shown in FIG. 16 is, so to speak, a pre-search to search for those contents which are indirectly related to the base content (first base content).

Figure 17:
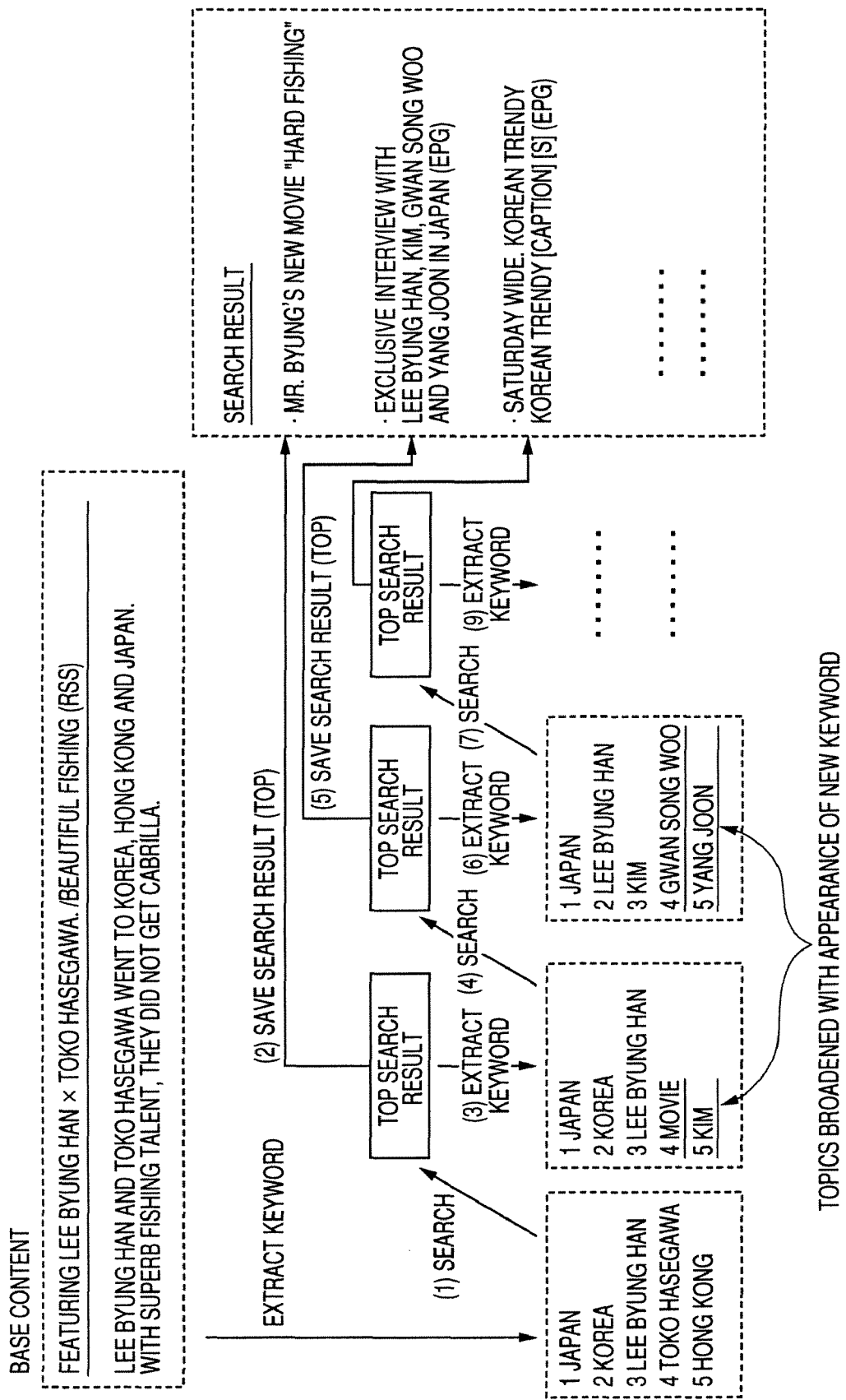
FIG. 17 is a further diagram for explaining a process of repeating the related content search.

FIG. 17 is a diagram illustrating a process of repeating the related content search and setting only that content in the related contents acquired as the search results in the repetitive process which has the highest degree of matching with the base content as a final search result.

In the example of FIG. 17, keyword extraction is executed with the RSS article entitled "Featuring Lee Byung Han× Toko Hasegawa . . . . " being taken as a base content, so that keywords "Japan", "Korea", "Lee Byung Han", "Toko Hasegawa" and "Hong Kong" are acquired. The first related content search is executed based on the keywords and the scores thereof, and the RSS article entitled "Mr. Byung's New Movie . . . " in the related contents acquired as the search results which has the highest degree of matching with the base content is saved as one of final search results.

Keyword extraction is executed with a base content being the RSS article entitled "Mr. Byung's New Movie . . . " searched out as a content having the highest degree of matching with the base content in the first related content search, thereby acquiring the keywords "Japan", "Korea", "Lee Byung Han", "Toko Hasegawa" and "Hong Kong". Based on the keywords and scores, a second related content search is performed, and the television program entitled "Exclusive Interview With Lee Byung Han, Kim, Gwan Song Woo and Yang Joon . . . " which has the highest degree of matching with the base content (the RSS article entitled "Mr. Byung's New Movie . . . ") in the related contents acquired as search results is saved as one of the final search results.

As a search is performed based on keywords "movie" and "Kim" included in the keywords extracted from the RSS article entitled "Mr. Byung's New Movie . . . ", but not extracted from the first base content, it is possible to search for contents indirectly related to the first base content.

In the example of FIG. 17, keyword extraction is executed with a base content being the television program entitled "Exclusive Interview With Lee Byung Han, Kim, Gwan Song Woo and Yang Joon . . . " which has the highest degree of matching with the base content in the second related content search, and keywords "Japan", "Lee Byung Han", "Kim", "Gwan Song Woo" and "Yang Joon" are acquired. Based on the keywords and the scores thereof, a third related content search is executed, and the television program entitled "Saturday Wide.Korean Trendy . . . " which has the highest degree of matching with the base content (the television program entitled "Exclusive Interview With Lee Byung Han, Kim, Gwan Song Woo and Yang Joon . . . ") in related contents acquired as the search results is saved as one of the final search results.

Figure 18:
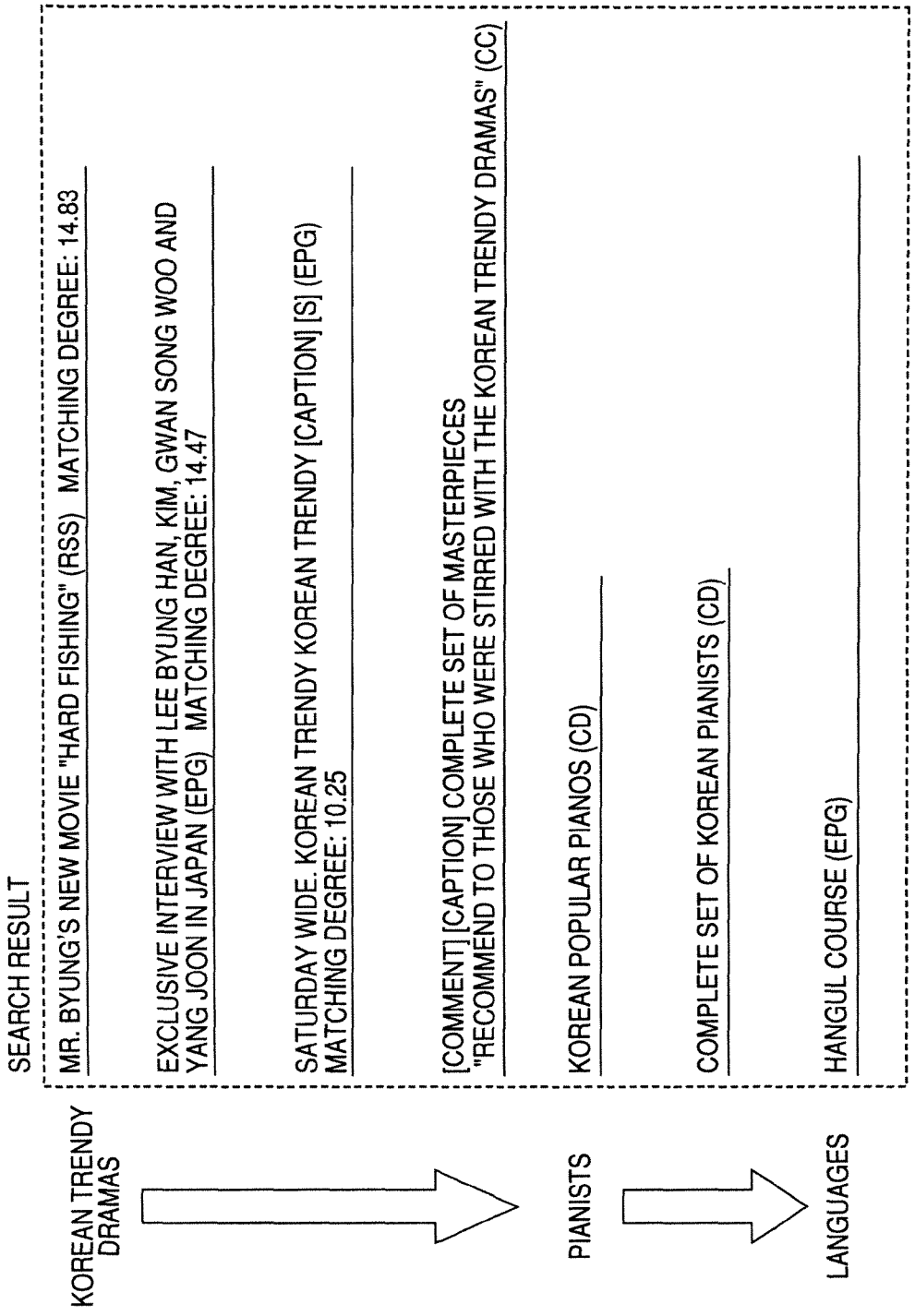
FIG. 18 is a diagram showing an example of the results of searching for related contents.

When the related contents as the final search results acquired by repeating the above-described related content search are arranged in the searched order, as shown in FIG. 18, while the content of Korean trendy dramas is acquired as a related content first, the related content acquired through searching is gradually changed to a pianist related content or a language related content.

Accordingly, the user can acquire, as search results, contents related to the first base content selected within the range where the contents do not change drastically.

Figure 19:
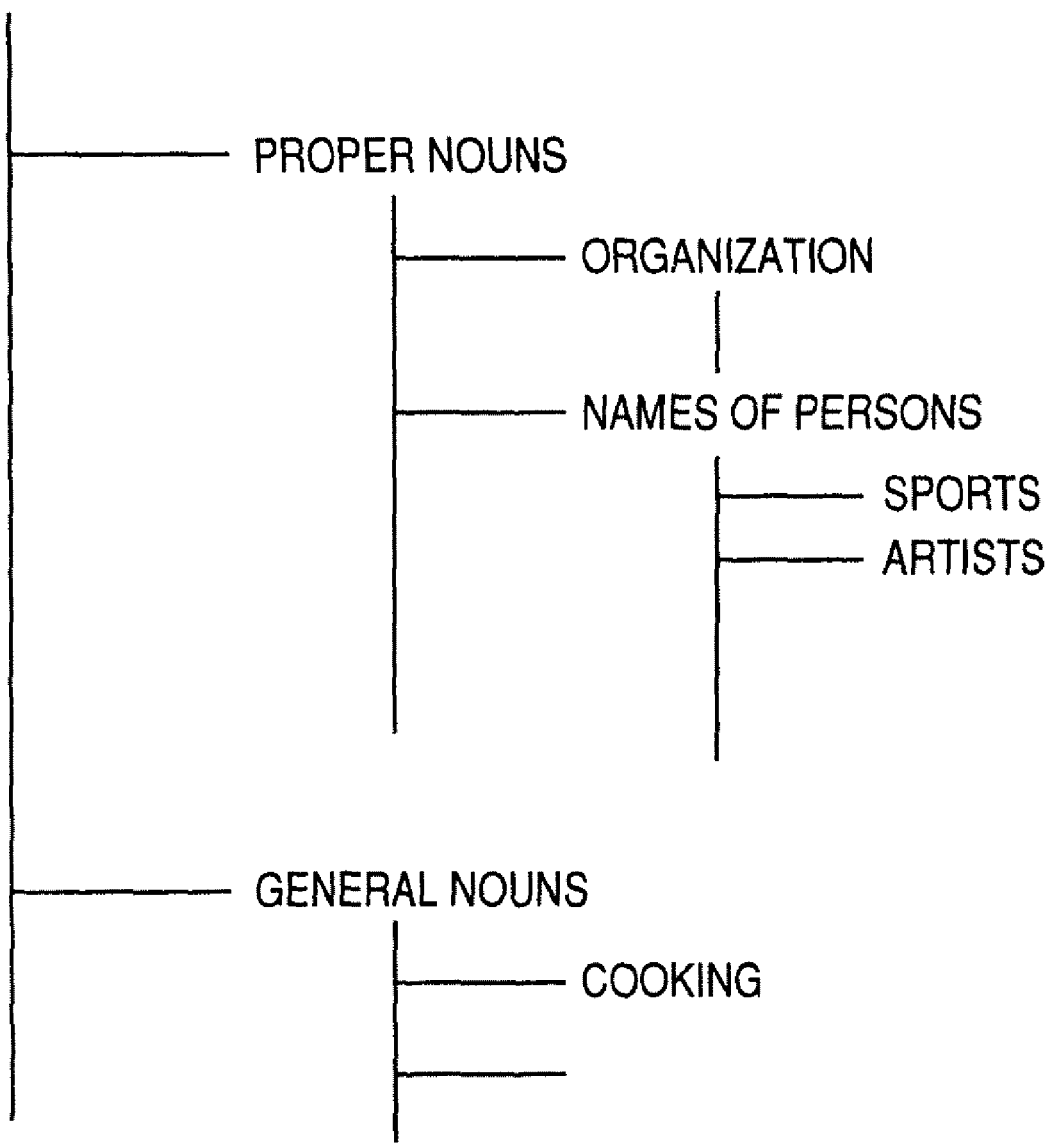
FIG. 19 is a diagram showing an example of the attributes of keywords.

As shown in FIG. 19, when attributes, such as a part of speech and category, are finely set for each keyword, only those keywords which are designated by the user, for example, may be used in the searching. For example, executing a search using only the keyword affixed with the attribute "cooking", the user can acquire only the contents searched out from cooking related contents as search results.

Although the server 1 connected to the network 3 searches for related contents as shown in FIG. 1 in the foregoing description, the device where related contents are searched is not limited to the one connected to the network 3. When a single device like a home server is provided with index data of various contents, for example, the home server may be configured to search for related contents.

Although a list of related contents is merely presented as search results in the foregoing description, related contents may be output in the order of scores. By selecting a television program, for example, the user can view recorded television programs or the like searched as related contents in the descending order of the degrees of matching with the selected television program.

The above-described sequence of processes can be executed by hardware as well as software. When the sequence of processes is executed by software, a program which constitutes the software is installed from a computer readable storage medium into a computer mounted in exclusive hardware, or a general-purpose personal computer or the like which can execute various functions as various programs are installed therein.

As shown in FIG. 7, the program recording medium that stores programs to be installed in a computer to be executable by the computer may be configured to be the removable medium 61 which is a package medium including a magnetic disk (including a flexible disk), an optical disk (including CD-ROM (Compact Disc Read Only Memory)), and DVD (Digital Versatile Disc)), a magneto-optical disk, or a semiconductor memory or so, the ROM 52 where programs are temporarily or permanently stored, a hard disk or the like constituting the storage unit 58.

The steps that describe the programs to be stored in the program recording medium include not only processes which are executed in a time-sequential order in the order described, but also processes which may not be executed in a time-sequential order but executed in parallel or individually in the present specification.

In the present specification, the "system" represents a whole apparatus which includes a plurality of devices.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a keyword extraction unit configured to extract keywords from text data representing a first content to be a base of a search, to set scores of the respective keywords extracted from the text data representing the first content, to extract keywords from text data representing a second content for calculating a degree of matching with the first content, and to set scores of the respective keywords extracted from the text data representing the second content, the scores of the respective keywords extracted from the text data representing the first and second content set in accordance with occurrence positions of the keywords within the first and second content;
a keyword expansion unit configured to expand the keywords extracted from the text data representing the first content data and to set scores of the expanded keywords based upon respective user-defined scoring coefficients of the expanded keywords;
a matching-degree calculation unit configured to calculate a degree of matching between the first content and the second content based on scores of keywords included in both the keywords extracted from the text data representing the first content and the keywords extracted from the text data representing the second content; and
an output unit configure to output, as a search result, information on a predetermined number of the second content which has a high degree of matching with the first content, based on a result of calculation performed by the matching-degree calculation unit, wherein
the matching-degree calculation unit is further configured to multiply the scores of the keywords included in both the keywords extracted from the text data representing the first content and the keywords extracted from the text data representing the second content, and to calculate, as the degree of matching between the first content and the second content, a value obtained by adding results of multiplications of the scores of the keywords included in both the keywords extracted from the text data representing the first content and the keywords extracted from the text data representing the second content.

2. The information processing apparatus according to claim 1, wherein
the keyword extraction unit is further configured to calculate the score of each keyword based on a frequency of occurrence of the keyword in text data.

3. The information processing apparatus according to claim 1, wherein
with a second content having a calculated degree of matching with the first content being a third content to be a base of a search,
the keyword extraction unit is further configured to extract keywords from text data representing the third content, to set scores of the respective keywords extracted from the text data representing the third content, to extract keywords from text data representing the second content, and to set scores of the respective keywords extracted from the text data representing the second content,
the matching-degree calculation unit is further configured to calculate a degree of matching between the third content and the second content based on scores of keywords included in both the keywords extracted from the text data representing the third content and the keywords extracted from the text data representing the second content, and
the output unit is further configured to output, as a search result, information on a predetermined number of the second content which has a high degree of matching with the third content, based on a result of calculation of the degree of matching between the third content and the second content performed by the matching-degree calculation unit.

4. The information processing apparatus according to claim 1, wherein
the output unit is further configured to output, as the search result, a list of information on the predetermined number of the second content which has the high degree of matching with the first content based on the result of calculation performed by the matching-degree calculation unit.

5. The information processing apparatus according to claim 1, wherein
based on the result of calculation performed by the matching-degree calculation unit, the output unit is further configured to output, as a search result, information on the predetermined number of the second content which has the high degree of matching with the first content in a descending order of a degree of matching.

6. The information processing apparatus according to claim 1, wherein
each of the occurrence positions are prioritized such that keywords which occur within an occurrence position of higher priority are assigned a higher score than keywords which occur within an occurrence position of lower priority.

7. The information processing apparatus according to claim 1, wherein
the keyword extraction unit is further configured to calculate the score of each keyword based on an attribute of the keyword such that keywords including a proper noun or a name are assigned a higher score than keywords including a general noun or verb.

8. The information processing apparatus according to claim 1, wherein
the keyword expansion unit is further configured to expand the keywords extracted from the text data representing the first content data to determine at least one of synonym keywords, broader keywords, narrower keywords, and related keywords, and to set the scores of the expanded keywords based upon respective user-defined scoring coefficients of the synonym keywords, broader keywords, narrower keywords, and related keywords.

9. The information processing apparatus according to claim 1, wherein
the matching-degree calculation unit is further configured to calculate the degree of matching between the first content and the second content based on the scores of the expanded keywords.

10. An information processing method comprising:
extracting keywords from text data representing a first content to be a base of a search;
setting scores of the respective keywords extracted from the text data representing the first content;
extracting keywords from text data representing a second content for calculating a degree of matching with the first content;
setting scores of the respective keywords extracted from the text data representing the second content, the scores of the respective keywords extracted from the text data representing the first and second content set in accordance with occurrence positions of the keywords within the first and second content;
expanding the keywords extracted from the text data representing the first content;
setting scores of the expanded keywords based upon respective user-defined scoring coefficients of the expanded keywords;
calculating a degree of matching between the first content and the second content based on scores of keywords included in both the keywords extracted from the text data representing the first content and the keywords extracted from the text data representing the second content; and
outputting, as a search result, information on a predetermined number of the second content which has a high degree of matching with the first content, based on a result of the calculating, wherein
the calculating includes multiplying the scores of the keywords included in both the keywords extracted from the text data representing the first content and the keywords extracted from the text data representing the second content, and calculating, as the degree of matching between the first content and the second content, a value obtained by adding results of multiplications of the keywords included in both the keywords extracted from the text data representing the first content and the keywords extracted from the text data representing the second content.

11. A computer readable storage medium storing computer readable instructions thereon, that, when executed by a processor, cause the processor to execute a process comprising:
extracting keywords from text data representing a first content to be a base of a search;
setting scores of the respective keywords extracted from the text data representing the first content;
extracting keywords from text data representing a second content for calculating a degree of matching with the first content;
setting scores of the respective keywords extracted from the text data representing the second content, the scores of the respective keywords extracted from the text data representing the first and second content set in accordance with occurrence positions of the keywords within the first and second content;
expanding the keywords extracted from the text data representing the first content;
setting scores of the expanded keywords based upon respective user-defined scoring coefficients of the expanded keywords;
calculating a degree of matching between the first content and the second content based on scores of keywords included in both the keywords extracted from the text data representing the first content and the keywords extracted from the text data representing the second content; and
outputting, as a search result, information on a predetermined number of the second content which has a high degree of matching with the first content, based on a result of the calculating, wherein
the calculating includes multiplying the scores of the keywords included in both the keywords extracted from the text data representing the first content and the keywords extracted from the text data representing the second content, and calculating, as the degree of matching between the first content and the second content, a value obtained by adding results of multiplications of the scores of the keywords included in both the keywords extracted from the text data representing the first content and the keywords extracted from the text data representing the second content.

* * * * *